United States Patent
Liu et al.

(10) Patent No.: US 12,510,777 B2
(45) Date of Patent: Dec. 30, 2025

(54) BACKLIGHT MODULE, DISPLAY APPARATUS, AND TOUCH DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Xiaoli Liu, Beijing (CN); Tianma Li, Beijing (CN); Liang Li, Beijing (CN); Dake Wang, Beijing (CN); Yuangang Zhu, Beijing (CN)

(73) Assignees: Chengdu BOE Optoelectronics Technology Co., Ltd., Sichuan (CN); BOE Technology Group, Co., Ltd., Beijing (CN)

( * ) Notice: Subject to any disclaimer, the term of this patent is extended or adjusted under 35 U.S.C. 154(b) by 0 days.

(21) Appl. No.: 18/852,942

(22) PCT Filed: Sep. 29, 2022

(86) PCT No.: PCT/CN2022/122838
§ 371 (c)(1),
(2) Date: Sep. 30, 2024

(87) PCT Pub. No.: WO2024/065479
PCT Pub. Date: Apr. 4, 2024

(65) Prior Publication Data
US 2025/0224633 A1  Jul. 10, 2025

(51) Int. Cl.
*G02F 1/1333* (2006.01)
*G02F 1/13357* (2006.01)

(52) U.S. Cl.
CPC .. *G02F 1/133325* (2021.01); *G02F 1/133314* (2021.01); *G02F 1/133317* (2021.01); *G02F 1/133615* (2013.01)

(58) Field of Classification Search
CPC ......... G02F 1/133325; G02F 1/133314; G02F 1/133317; G02F 1/133615; F21V 17/005
See application file for complete search history.

(56) References Cited

U.S. PATENT DOCUMENTS

| 2014/0176852 A1* | 6/2014 | Ha | G02F 1/133308 349/58 |
| 2014/0176867 A1* | 6/2014 | Huang | G02F 1/133308 362/606 |

(Continued)

FOREIGN PATENT DOCUMENTS

| CN | 104220925 A | 12/2014 |
| CN | 207704160 U | 8/2018 |

(Continued)

*Primary Examiner* — Erin Kryukova
(74) *Attorney, Agent, or Firm* — The Webb Law Firm

(57) ABSTRACT

A backlight module includes a backplane, a light source, an optical film set and a middle frame. The backplane includes an inner bottom frame and inner side frames that constitute a first accommodation space. The inner bottom frame includes side surfaces. The inner side frames are respectively connected to the side surfaces. The light source and the optical film set are disposed in the first accommodation space. The middle frame includes a fixing portion surrounding and connected to the inner side frames. The backplane includes a plurality of inner corners defined by the inner side frames and the inner bottom frame, and the fixing portion includes outer corners corresponding to and matching with the inner corners. A fool-proof structure is disposed at least at an inner corner of the backplane and an outer corner of the middle frame.

19 Claims, 12 Drawing Sheets

(56) References Cited

U.S. PATENT DOCUMENTS

| | | | | |
|---|---|---|---|---|
| 2015/0181656 A1* | 6/2015 | Bang | ................. | G02F 1/133308 |
| | | | | 313/512 |
| 2016/0033809 A1* | 2/2016 | Yaguchi | ............ | G02F 1/133308 |
| | | | | 349/58 |
| 2017/0123144 A1* | 5/2017 | Baek | .................... | G02B 6/0083 |
| 2019/0196251 A1* | 6/2019 | Woo | ................. | G02F 1/133308 |

FOREIGN PATENT DOCUMENTS

| | | | |
|---|---|---|---|
| CN | 207851474 U | | 9/2018 |
| CN | 113138478 A | | 7/2021 |
| JP | H10274941 A | * | 10/1998 |
| KR | 1020050008278 A | | 1/2005 |
| KR | 20150087631 A | * | 7/2015 |
| WO | 2021142772 A1 | | 7/2021 |

* cited by examiner

BACKLIGHT MODULE, DISPLAY APPARATUS, AND TOUCH DISPLAY APPARATUS

CROSS-REFERENCE TO RELATED APPLICATION

This application is the United States National Phase of International Patent Application No. PCT/CN2022/122838, filed Sep. 29, 2022, the disclosure of which is hereby incorporated by reference in its entirety.

BACKGROUND OF THE INVENTION

Field of the Invention

The present disclosure relates to the field of display technologies, and in particular, to a backlight module, a display apparatus and a touch display apparatus.

Description of Related Art

The liquid crystal display apparatus is a widely used display apparatus. The liquid crystal display apparatus includes a backlight module and a display panel. How to quickly tile and assemble the backlight module during production is a problem that needs to be solved.

SUMMARY OF THE INVENTION

In an aspect, a backlight module is provided. The backlight module includes a backplane, a light source, an optical film set and a middle frame. The backplane includes an inner bottom frame and a plurality of inner side frames, and the plurality of inner side frames and the inner bottom frame of the backplane constitute a first accommodation space. The inner bottom frame of the backplane includes a first surface and a second surface that are opposite, and a plurality of side surfaces each connecting the first surface and the second surface. The plurality of inner side frames of the backplane are respectively connected to the plurality of side surfaces of the inner bottom frame of the backplane and extend toward a side of the first surface of the inner bottom frame of the backplane. The light source is disposed in the first accommodation space. The optical film set is disposed in the first accommodation space. The middle frame includes a fixing portion surrounding the plurality of inner side frames of the backplane, and the plurality of inner side frames of the backplane are connected to the fixing portion of the middle frame.

The backplane includes a plurality of inner corners defined by the plurality of inner side frames and the inner bottom frame, and the fixing portion of the middle frame includes outer corners corresponding to and matching with the inner corners. A fool-proof structure is disposed at least at an inner corner of the backplane and an outer corner of the middle frame, and the fool-proof structure is used to distinguish installation directions of the backplane and the middle frame.

In some embodiments, the middle frame further includes an extension portion. An end of the extension portion of the middle frame is connected to the fixing portion of the middle frame, and another end of the extension portion of the middle frame extends to a side of the optical film set away from the inner bottom frame of the backplane.

At least one inner side frame in the plurality of inner side frames of the backplane is at least one selected inner side frame. At least one inner corner in the plurality of inner corners of the backplane is at least one first selected inner corner, and a first selected inner corner in the at least one first selected inner corner is defined by a selected inner side frame in the at least one selected inner side frame, an inner side frame adjacent to the selected inner side frame in the at least one selected inner side frame and the inner bottom frame.

At least one outer corner in the plurality of outer corners included in the fixing portion of the middle frame is at least one first selected outer corner, and a position of a first selected outer corner in the at least one first selected outer corner corresponds to a position of the first selected inner corner in the at least one first selected inner corner.

The fool-proof structure includes a first identification structure disposed at the first selected inner corner and a second identification structure disposed at the first selected outer corner and matching with the first identification structure.

In some embodiments, any inner side frame in the plurality of inner side frames of the backplane includes an inner surface and an outer surface that are opposite, and a surface of the inner side frame facing the first accommodation space is the inner surface of the inner side frame. The inner side frame of the backplane adjacent to the selected inner side frame in the at least one selected inner side frame and for defining the first selected inner corner in the at least one first selected inner corner is a first adjacent inner side frame An end of the selected inner side frame of the backplane proximate to the first selected inner corner is flush with an inner surface of the first adjacent inner side frame. An end of the first adjacent inner side frame of the backplane proximate to the first selected inner corner and an inner surface of the selected inner side frame have a first set distance therebetween. The ends of the selected inner side frame and the first adjacent inner side frame of the backplane are not connected. A structure of the backplane at the first selected inner corner serves as the first identification structure.

The fixing portion of the middle frame includes a first fixing sub-portion surrounding the selected inner side frame and a second fixing sub-portion surrounding the first adjacent inner side frame. The second fixing sub-portion of the middle frame at least includes a first part and second part. The first part of the second fixing sub-portion of the middle frame is located outside the first adjacent inner side frame of the backplane, and the second part of the second fixing sub-portion of the middle frame is flush with the first adjacent inner side frame of the backplane and connected to the first fixing sub-portion of the middle frame. A structure of the middle frame at the first selected outer corner serves as the second identification structure.

In some embodiments, the inner bottom frame of the backplane is provided with a notch therein at the first selected inner corner, and the end of the first adjacent inner side frame of the backplane proximate to the first selected inner corner is flush with the notch. The backlight module further includes a protective structure disposed at the first selected inner corner.

The protective structure includes a main body portion. The main body portion is disposed on a side of the second surface of the inner bottom frame of the backplane, and the main body portion of the protective structure blocks the notch of the inner bottom frame at the first selected inner corner. The first identification structure further includes the notch and the protective structure.

In some embodiments, the protective structure further includes a first extension portion. An end of the first extension portion of the protective structure is connected to the main body portion of the protective structure, and another end of the first extension portion of the protective structure extends to an outer surface of the selected inner side frame of the backplane.

In some embodiments, the protective structure further includes a first extension portion and a second extension portion. An end of the first extension portion of the protective structure is connected to the main body portion of the protective structure, and another end of the first extension portion of the protective structure extends to an outer surface of the selected inner side frame of the backplane. An end of the second extension portion of the protective structure is connected to the main body portion of the protective structure, and another end of the second extension portion of the protective structure extends to an outer surface of the first adjacent inner side frame of the backplane.

In some embodiments, at least one inner corner in the plurality of inner corners of the backplane is at least one second selected inner corner, and a second selected inner corner in the at least one second selected inner corner of the backplane and the first selected inner corner in the at least one first selected inner corner of the backplane are located on both sides of the selected inner side frame of the backplane. At least one outer corner in the plurality of outer corners included in the fixing portion of the middle frame is at least one second selected outer corner, and a position of a second selected outer corner in the at least one second selected outer corner of the middle frame corresponds to a position of the second selected inner corner in the at least one second selected inner corner of the backplane.

The fool-proof structure further includes a third identification structure disposed at the second selected inner corner of the backplane and a fourth identification structure disposed at the second selected outer corner of the middle frame and matching with the third identification structure.

In some embodiments, another inner side frame adjacent to the selected inner side frame in the at least one selected inner side frame of the backplane and for defining the second selected inner corner in the at least one second selected inner corner is a second adjacent inner side frame. The selected inner side frame of the backplane includes a first part and a second part. The first part of the selected inner side frame of the backplane is connected to a side surface of the inner bottom frame of the backplane and extends toward the side of the first surface of the inner bottom frame of the backplane, and an end of the second adjacent inner side frame of the backplane proximate to the second selected inner corner of the backplane and an inner surface of the first part of the selected inner side frame of the backplane have a second set distance therebetween.

The second part of the selected inner side frame of the backplane is bent from an end of the first part of the selected inner side frame of the backplane toward the second adjacent inner side frame of the backplane and connected to the second adjacent inner side frame of the backplane. A bending position of the selected inner side frame of the backplane is the second selected inner corner of the backplane.

A structure of the backplane at the second selected inner corner serves as the third identification structure. The second selected outer corner of the middle frame has a right-angled structure matching with the second selected inner corner of the backplane, and the right-angled structure serves as the fourth identification structure.

In some embodiments, the plurality of inner side frames of the backplane include two selected inner side frames, a first adjacent inner side frame and a second adjacent inner side frame. The two selected inner side frames are disposed oppositely, and the first adjacent inner side frame and the second adjacent inner side frame are disposed oppositely.

The plurality of inner corners of the backplane include two first selected inner corners and two second selected inner corners. The two first selected inner corners are located at both ends of the first adjacent inner side frame of the backplane, and the two second selected inner corners are located at both ends of the second adjacent inner side frame of the backplane.

The plurality of outer corners of the middle frame include two first selected outer corners and two second selected outer corners. Positions of the two first selected outer corners respectively correspond to positions of the two first selected inner corners of the backplane, and positions of the two second selected outer corners of the middle frame respectively correspond to positions of the two second selected inner corners of the backplane.

In some embodiments, at least one inner side frame in the plurality of inner side frames of the backplane is at least one selected inner side frame. The inner bottom frame of the backplane includes an outer convex portion proximate to a selected inner side frame in the at least one selected inner side frame of the backplane and facing a side of the second surface of the inner bottom frame of the backplane, and the outer convex portion of the inner bottom frame of the backplane and the selected inner side frame of the backplane constitute a second accommodation space. The outer convex portion of the inner bottom frame of the backplane extends in an extension direction of the selected inner side frame of the backplane.

The light source includes a light bar and a light guide plate. The light bar is attached to an inner surface of the selected inner side frame of the backplane. An end of the light bar is located in the second accommodation space. The light guide plate is located in the first accommodation space and located on a side of the optical film set proximate to the inner bottom frame of the backplane.

In some embodiments, a set direction is perpendicular to the first surface of the inner bottom frame of the backplane. A sum of a dimension of the light bar in the set direction and a distance between the light bar and the middle frame in the set direction is equal to a sum of a distance between a surface of the optical film set away from the inner bottom frame and the first surface of the inner bottom frame, a distance between the surface of the optical film set away from the inner bottom frame and the middle frame in the set direction, and a dimension of the second accommodation space in the set direction.

In some embodiments, the selected inner side frame of the backplane includes a first part and a second part. The first part of the selected inner side frame is connected to a side surface of the inner bottom frame and extends toward the side of the first surface of the inner bottom frame; and the second part of the selected inner side frame is bent from an end of the first part of the selected inner side frame toward an inner side frame adjacent to the selected inner side frame. The selected inner side frame of the backplane further includes a convex part disposed on a side of the second part of the selected inner side frame facing the second surface of the inner bottom frame. An orthographic projection of the outer convex portion of the inner bottom frame on a first plane is at least overlapped with an orthographic projection of the convex part of the selected inner side frame on the first plane, and the first plane is perpendicular to an extension direction of the outer convex portion of the inner bottom frame.

In some embodiments, a material of the fixing portion of the middle frame includes metal, and a material of the extension portion of the middle frame includes rubber.

In some embodiments, a thickness of any part of the fixing portion of the middle frame in a direction perpendicular to an inner surface of an inner side frame, corresponding to the part of the fixing portion, of the backplane is in a range of 0.3 mm to 0.5 mm, inclusive.

In some embodiments, the middle frame further includes at least one positioning protrusion disposed on a side of the extension portion facing the optical film set, and the positioning protrusion abuts against the light guide plate to limit a position of the light guide plate in the first accommodation space.

In some embodiments, the backlight module further includes a snap-in structure. The snap-in structure includes at least one snap-in piece disposed on outer surfaces of the plurality of inner side frames of the backplane, and a positioning connecting piece disposed on the middle frame and corresponding to the at least one snap-in piece. The at least one snap-in piece cooperates with the positioning connecting piece to connect and fix the backplane and the middle frame.

In another aspect, a display apparatus is provided. The display apparatus includes the backlight module as described in any of the above embodiments, a rear shell, a cover plate and a display panel.

The backplane of the backlight module includes the inner bottom frame and the plurality of inner side frames, and at least one inner side frame in the plurality of inner side frames of the backplane is at least one selected inner side frame. The inner bottom frame of the backplane includes an outer convex portion proximate to a selected inner side frame in the at least one selected inner side frame and facing a side of the second surface of the inner bottom frame of the backplane. The outer convex portion of the inner bottom frame of the backplane and the selected inner side frame of the backplane constitute a second accommodation space. The outer convex portion of the inner bottom frame of the backplane extends in an extension direction of the selected inner side frame.

The rear shell includes an outer bottom frame and a plurality of outer side frames. The outer bottom frame of the rear shell includes a first surface and a second surface that are opposite, and a plurality of side surfaces each connecting the first surface and the second surface of the outer bottom frame. The plurality of outer side frames of the rear shell are respectively connected to the plurality of side surfaces of the outer bottom frame of the rear shell and extend toward a side of the first surface of the outer bottom frame of the rear shell. At least one outer side frame in the plurality of outer side frames is at least one selected outer side frame. The outer bottom frame of the rear shell includes an inner convex portion proximate to a selected outer side frame in the at least one selected outer side frame and facing a side of the first surface of the outer bottom frame. The inner convex portion of the rear shell is clamped with the outer convex portion of the backplane. The inner convex portion of the rear shell is further away from the selected outer side frame of the rear shell than the outer convex portion of the backplane. An extension direction of the inner convex portion of the rear shell is the same as an extending direction of the outer convex portion of the backplane.

The cover plate is disposed on the side of the first surface of the outer bottom frame of the rear shell. The cover plate and both the plurality of outer side frames and the outer bottom frame of the rear shell constitute a third accommodation space, and the backlight module is disposed within the third accommodation space. The display panel is disposed in a space between the middle frame and the cover plate.

In some embodiments, the middle frame further includes an extension portion connected to the fixing portion, and a connecting portion located on a side of the extension portion away from the fixing portion. An end of the connecting portion of the middle frame away from the extension portion is connected to the display panel.

In some embodiments, the middle of the outer bottom frame of the rear shell is provided with an inner convex portion facing a side of the second surface of the outer bottom frame of the rear shell. A distance between the inner convex portion of the outer bottom frame of the rear shell and the inner bottom frame of the backplane is greater than or equal to a distance between a remaining portion of the outer bottom frame of the rear shell and the inner bottom frame of the backplane.

In some embodiments, a surface of the fixing portion of the middle frame away from the outer side frame of the rear shell and the outer side frame have a third set distance therebetween.

In yet another aspect, a touch display apparatus is provided. The touch display apparatus includes the display apparatus as described in any of the above embodiments and a touch module. The touch module is integrated inside the display panel or disposed on a side of the display panel away from the backlight module.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

DESCRIPTION OF THE INVENTION

Figure 1:
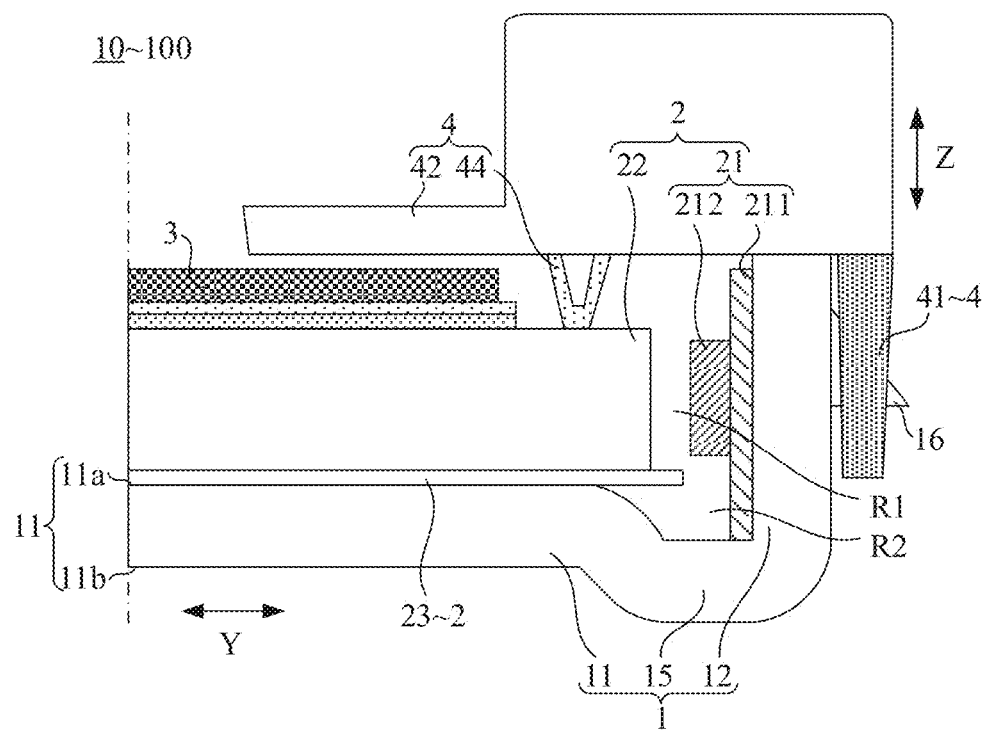
FIG. 1 is a structural diagram of a backlight module, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled", "connected" and derivatives thereof may be used. For example, the term "connected" may be used in the description of some embodiments to indicate that two or more elements are in direct physical or electrical contact with each other. As another example, the term "coupled" may be used in the description of some embodiments to indicate that two or more elements are in direct physical or electrical contact. However, the term "coupled" may also mean that two or more elements are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phrase "applicable to" or "configured to" as used herein indicates an open and inclusive expression, which does not exclude apparatuses that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "about", "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art in view of measurement in question and errors associated with the measurement of a particular quantity (i.e., limitations of the measurement system). For example, the term "parallel" includes absolute parallelism and approximate parallelism, and an acceptable range of deviation of the approximate parallelism may be a deviation within 5°; the term "perpendicular" includes absolute perpendicularity and approximate perpendicularity, and an acceptable range of deviation of the approximate perpendicularity may also be a deviation within 5°; and the term "equal" includes absolute equality and approximate equality, and an acceptable range of deviation of the approximate equality may be a difference between two equals being less than or equal to 5% of either of the two equals.

It will be understood that when a layer or element is referred to as being on another layer or substrate, the layer or element may be directly on the another layer or substrate, or there may be intermediate layer(s) between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the region shown in the accompanying drawings are schematic in nature, and their shapes are not intended to show actual shapes of the regions in an apparatus, and are not intended to limit the scope of the exemplary embodiments.

Some embodiments of the present disclosure provide a backlight module 10. As shown in FIG. 1, the backlight module 10 includes a backplane 1, a light source 2, an optical film set 3 and a middle frame 4. The backplane 1 includes an inner bottom frame 11 and a plurality of inner side frames 12. The plurality of inner side frames 12 and the inner bottom frame 11 of the backplane 1 form a first accommodation space R1. The inner bottom frame 11 of the backplane 1 includes a first surface 11a and a second surface 11b that are opposite, and a plurality of side surfaces 11c (referring to FIG. 10) each connecting the first surface 11a and the second surface 11b of the backplane. The plurality of inner side frames 12 of the backplane 1 are respectively connected to the plurality of side surfaces of the inner bottom frame 11 of the backplane 1 and extend toward a side of the first surface 11a of the inner bottom frame 11. The light source 2 is provided in the first accommodation space R1. The optical film set 3 is provided in the first accommodation space R1. The middle frame 4 includes a fixing portion 41 surrounding the plurality of inner side frames 12 of the backplane 1. The plurality of inner side frames 12 of the backplane 1 are connected to the fixing portion 41 of the middle frame 4.

Figure 2:
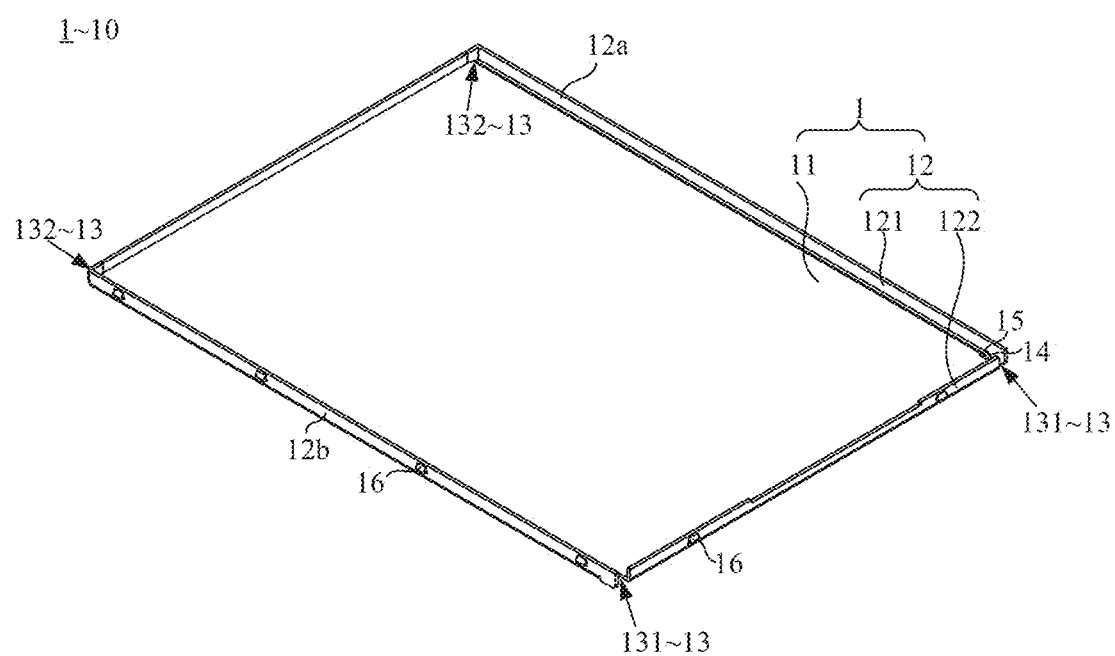
FIG. 2 is a structural diagram of a backplane of a backlight module, in accordance with some embodiments.

As shown in FIGS. 1 and 2, the backplane 1 has a sunken structure. The backplane 1 includes an inner bottom frame 11 and a plurality of inner side frames 12. The inner bottom frame 11 includes a first surface 11a and a second surface 11b that are opposite. The first surface 11a faces a light exit side of the backlight module 10, and the second surface 11b faces a backlight side of the backlight module. For example, the inner bottom frame 11 is square with four sides, and adjacent sides are perpendicular to each other. The plurality of inner side frames 12 are respectively connected to a plurality of side surfaces of the inner bottom frame 11 and extend toward a side of the first surface 11a of the inner bottom frame 11, so that the plurality of inner side frames 12 of the backplane 1 and the inner bottom frame 11 form a first accommodation space R1.

For example, the inner bottom frame 11 and the plurality of inner side frames 12 of the backplane 1 are of an integrated structure.

In some examples, the backplane 1 is formed by a sheet metal process.

Figure 3A:
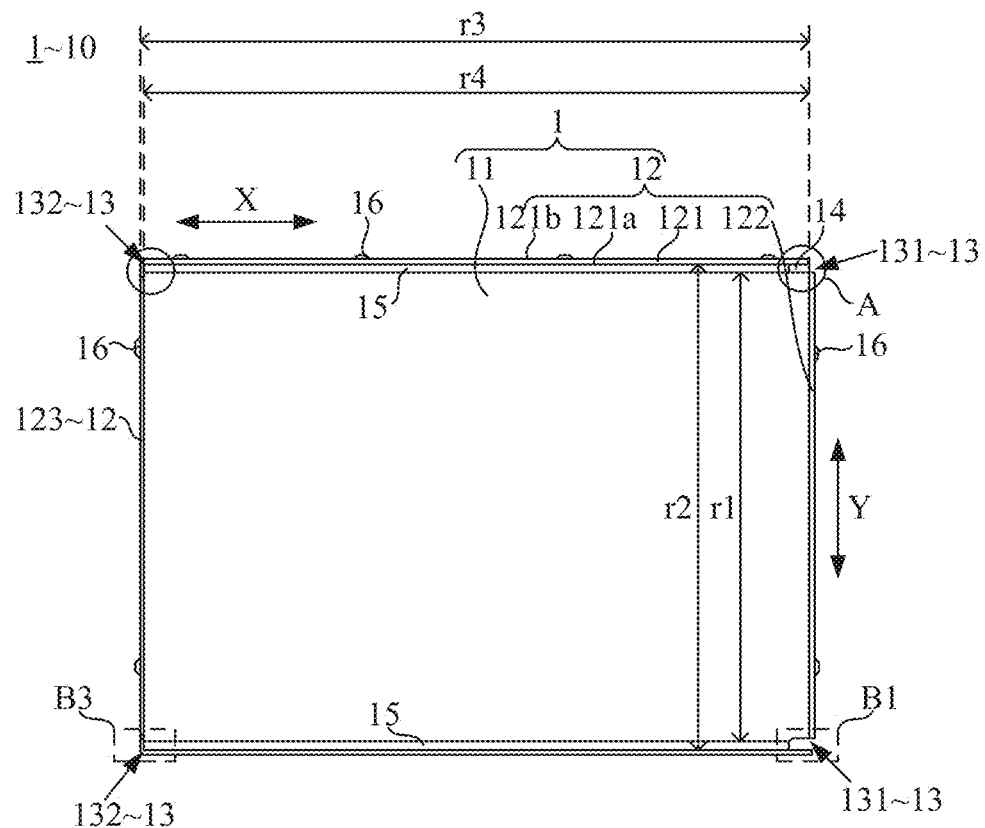
FIG. 3A is a top view showing a structure of a backplane of a backlight module, in accordance with some embodiments.

For example, as shown in FIG. 3A, the plurality of inner side frames 12 of the backplane 1 include at least one selected inner side frame 121, and both ends of the selected inner side frame 121 are adjacent to two inner side frames 12. An inner side frame 12 adjacent to the selected inner side frame 121 is called a first adjacent inner side frame 122, and another inner side frame 12 adjacent to the selected inner side frame 121 is called a second adjacent inner side frame 123. In some examples, the first adjacent inner side frame 122 and the second adjacent inner side frame 123 are provided oppositely.

A dimension of the inner side frame 12 in a direction perpendicular to the first surface 11a of the inner bottom frame 11 of the backplane 1 is called a height of the inner side frame 12. As shown in FIG. 1, a dimension of the inner side frame 12 of the backplane 1 in a direction Z shown in FIG. 1 is the length of the inner side frame 12. Dimensions of the first adjacent inner side frame 122 and the second adjacent inner side frame 123 in a Y direction shown in FIG. 3A are called lengths of the first adjacent inner side frame 122 and the second adjacent inner side frame 123. Accordingly, dimensions of the first adjacent inner side frame 122 and the second adjacent inner side frame 123 in an X direction shown in FIG. 3A are called thicknesses of the first adjacent inner side frame 122 and the second adjacent inner side frame 123. A dimension of the selected inner side frame 121 in the X direction shown in FIG. 3A is called a length of the selected inner side frame 121. Accordingly, a dimension of the selected inner side frame 121 in the Y direction shown in FIG. 3A is called a thickness of the selected inner side frame 121.

It will be noted that the plurality of inner side frames 12 of the backplane 1 extend from the first surface 11a of the inner bottom frame 11 of the backplane 1. However, in the following description of the inner side frame 12, an extension direction of the inner side frame 12 refers to a direction of the length of the inner side frame 12. Accordingly, in an inner side frame 12 and a side surface of an inner bottom frame 11 of the backplane 1 that are correspondingly connected, a length of the side surface of the inner bottom frame 11 of the backplane 1 refers to a dimension of the side surface of the inner bottom frame 11 of the backplane 1 in a direction of the length of the inner side frame 12 connected to thereto.

The plurality of inner side frames 12 of the backplane 1 are respectively connected to the plurality of side surfaces of the inner bottom frame 11 of the backplane 1 and extend toward a side of the first surface 11a of the inner bottom frame 11. As shown in FIG. 3A, in corresponding inner side frame 12 and side surface, a length of the inner side frame 12 in an extension direction thereof (e.g., the X direction or the Y direction shown in FIG. 3A) is not equal to a dimension of the side surface, to which the inner side frame 12 is adjacent, of the inner bottom frame 11 of the backplane 1 in the same direction. For example, the length of the inner side frame 12 is less than the length of the side surface connected thereto, and the inner side frame 12 is only connected to the middle of the side surface. For example, as shown in FIG. 3A, a length r1 of the first adjacent inner side frame 122 in the Y direction in FIG. 3A is less than a length r2 of the side surface, to which the first adjacent inner side frame 122 is adjacent, of the inner bottom frame 11 of the backplane 1 in the Y direction in FIG. 3A.

For example, as shown in FIGS. 2 and 3A, the backplane 1 includes four inner side frames 12. The four inner side frames 12 of the backplane 1 are all perpendicular to the inner bottom frame 11 of the backplane 1, and two adjacent inner side frames 12 are perpendicular to each other.

The light source 2 and the optical film set 3 are provided in the first accommodation space R1 of the backplane 1. The backplane 1 surrounds the light source 2 and the optical film set 3, and can protect the light source 2 and the optical film set 3 to avoid affecting the quality of the backlight module 10 due to scratching by the light source 2 and the optical film set 3.

Figure 4:
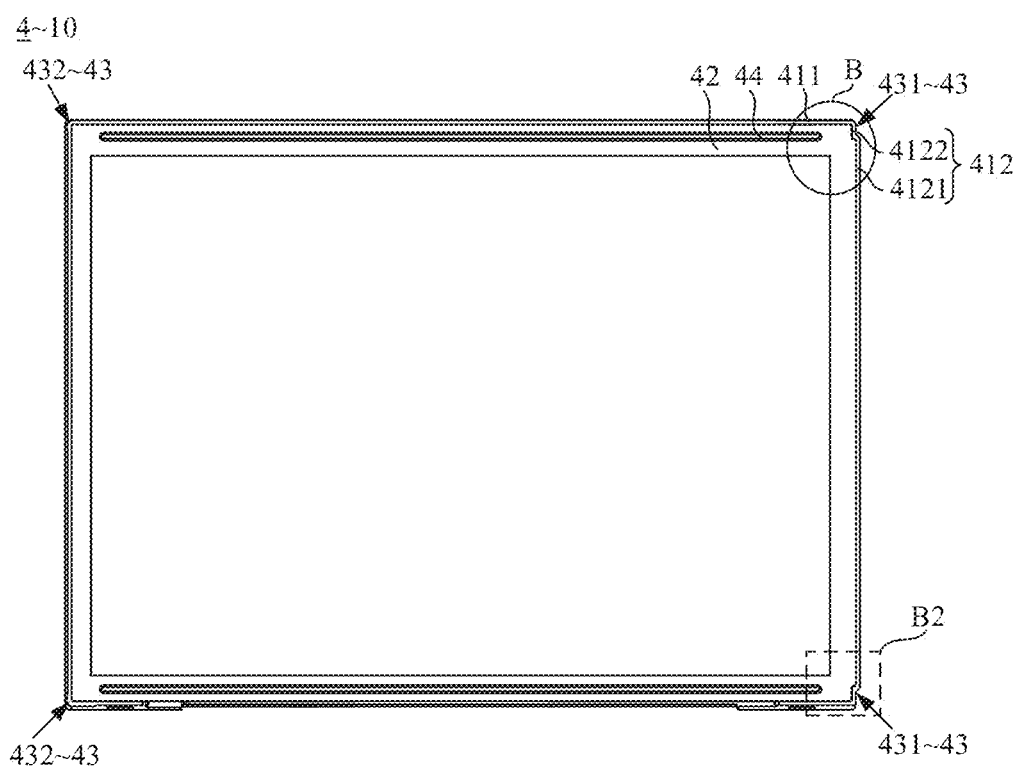
FIG. 4 is a top view showing a structure of a middle frame of a backlight module, in accordance with some embodiments.

The fixing portion 41 of the middle frame 4 surrounds the plurality of inner side frames 12 of the backplane 1. The fixing portion 41 of the middle frame 4 is disposed outside the plurality of inner side frames 12 of the backplane 1. From the top view of the backlight module 10, as shown in FIG. 4, the fixing portion 41 of the middle frame 4 is in a frame shape and surrounds a frame structure formed by the plurality of inner side frames 12 of the backplane 1. For example, corresponding to the four inner side frames 12 of the backplane 1, the fixing portion 41 of the middle frame 4 includes four fixing sub-portions, and every two adjacent fixing sub-portions are perpendicular to each other.

Figure 5:
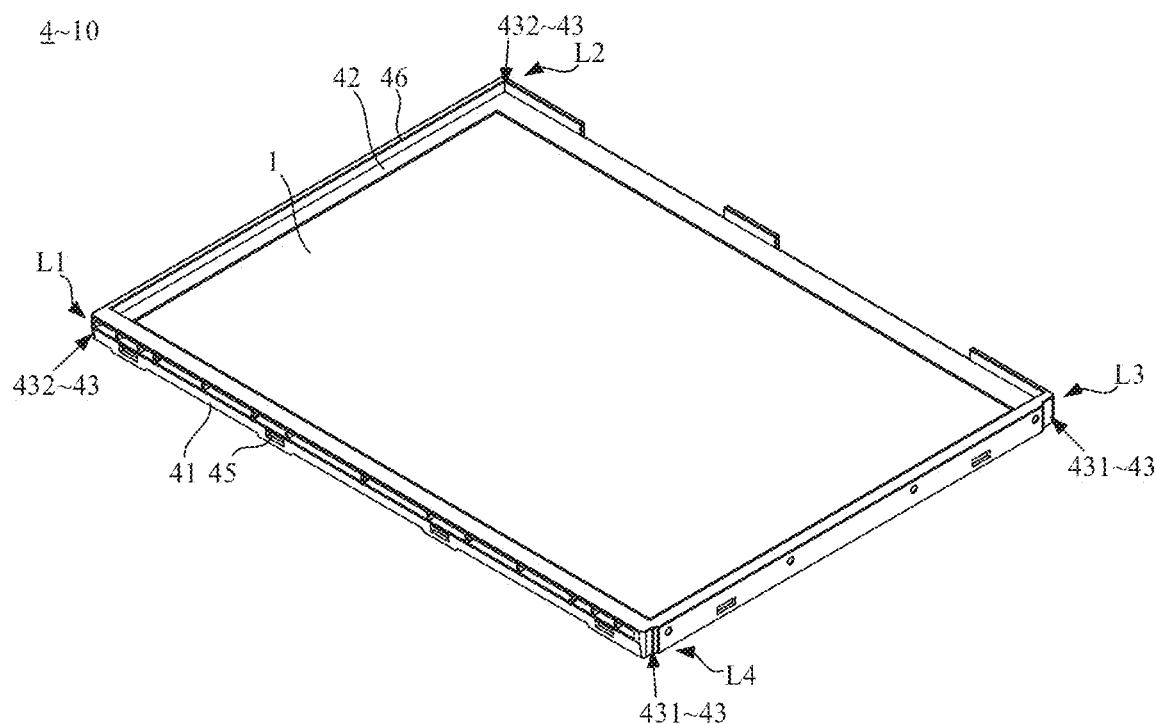
FIG. 5 is a structural diagram of a middle frame of a backlight module, in accordance with some embodiments.

The plurality of inner side frames 12 of the backplane 1 are connected to the fixing portion 41 of the middle frame 4. For example, the backlight module 10 further includes a snap-in structure. As shown in FIGS. 1, 2 and 5, the snap-in structure includes at least one snap-in piece 16 disposed on outer surfaces 12b of the plurality of inner side frames 12 of the backplane 1, and a positioning connecting piece 45 disposed on the middle frame 4 and corresponding to the at least one snap-in piece 16. The at least one snap-in piece 16 cooperates with the positioning connecting piece 45 to connect and fix the backplane 1 and the middle frame 4.

In some embodiments, the at least one snap-in piece 16 disposed on the outer surfaces 12b of the plurality of inner side frames 12 of the backplane 1 is a tapered protrusion, a tip end of the tapered protrusion is called a top of the tapered protrusion, and correspondingly the other end of the tapered protrusion is a bottom of the tapered protrusion. The bottom of the tapered protrusion serving as the snap-in piece 16 is fixed on the outer surfaces 12b of the inner side frames 12 of the backplane 1. The positioning connecting piece 45 disposed on the middle frame 4 and corresponding to the at least one snap-in piece 16 is a connecting via hole extending through the fixing portion 41 of the middle frame 4, and the position and the size of the via hole are match with the tapered protrusion disposed on the inner side frames 12 of the backplane 1.

During assembly of the backlight module 10, the fixing portion 41 of the middle frame 4 is sleeved outside the plurality of inner side frames 12 of the backplane 1 from top to bottom in the Z direction shown in FIG. 1, and the tip end of the tapered protrusion on the inner side frame 12 of the backplane 1 is inserted into the connecting via hole provided in the fixing portion 41 of the middle frame 4, so as to realize connection and fixation between the backplane 1 and the middle frame 4. With such a design, there is no need to provide additional fixed connecting pieces such as double-sided tape, and the backplane 1 and the middle frame 4 may be connected and fixed using their own structures, which facilitates installation and is beneficial to improving an installation efficiency of the backlight module 10.

In some examples, as shown in FIG. 1, the snap-in piece 16 provided on the inner side frame 12 of the backplane 1 is a tapered protrusion, a surface of the tapered protrusion proximate to the inner bottom frame 11 of the backplane 1 is a flat surface, and there is a certain angle between a surface of the tapered protrusion away from the inner bottom frame 11 of the backplane 1 and the fixing portion 41 of the middle frame 4. For example, the tapered protrusion is a triangular prism, and an extending direction of the triangular prism is the same as an extending direction of the inner side frame 12 where the triangular prism is located. With such a design, in a case where the middle frame 4 is sleeved outside the backplane 1, a surface, in contact with the connecting via hole of the middle frame 4, of the tapered protrusion serving as the snap-in piece 16 during installation is a bevel, so that the middle frame 4 will not be subjected to significant resistance when gradually approaching the backplane 1 in the Z direction shown in FIG. 1, which facilitates the installation of the backplane 1 and the middle frame 4. In addition, after the middle frame 4 and the backplane 1 are connected and fixed, a surface of the tapered protrusion in contact with the connecting via hole is a flat surface, so that the tapered protrusion is not prone to detaching from the connecting via hole, which is beneficial to ensuring the connection stability between the backplane 1 and the middle frame 4, and further ensuring the quality of the backlight module 10.

Figure 3B:
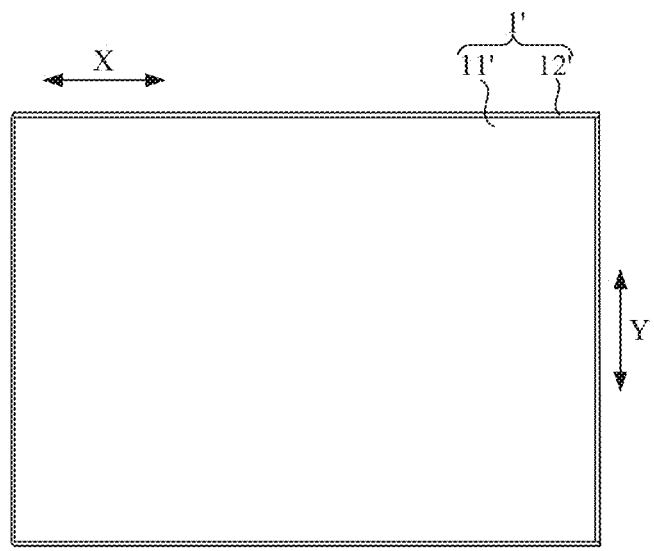
FIG. 3B is a top view showing a structure of another backplane of a backlight module, in accordance with some embodiments.

During tiling and assembling various components in the backlight module 10, if there are no marks on outline designs of the backplane 1 and the middle frame 4 or there are no differences between positions of the backplane 1 and the middle frame 4, it is unable to determine how the backplane 1 corresponds to the middle frame 4 when the middle frame 4 and the backplane 1 are assembled, and thus assembly errors are prone to occur, resulting in a reduction of production efficiency and an increase in labor and time cost. For example, as shown in FIG. 3B, a backplane 1' includes an inner bottom frame 11' and a plurality of inner side frames 12'. Corner positions each formed by two adjacent inner side frames 12' and the inner bottom frame 11' of the backplane 1 are all right angles, and a plurality of corner positions of the backplane 1 have the same structures and no difference.

In light of this, as shown in FIGS. 2, 3A, 4 and 5, the backplane 1 includes a plurality of inner corners 13 formed by the plurality of inner side frames 12 and the inner bottom frame 11, and the fixing portion 41 of the middle frame 4 includes outer corners 43 corresponding to and matching with the inner corners 13. A fool-proof structure is provided at least at an inner corner 13 of the backplane 1 and an outer corner 43 of the middle frame 4, and the fool-proof structure is used to distinguish the installation directions of the backplane 1 and the middle frame 4.

As shown in FIGS. 2 and 3A, the plurality of inner corners 13 of the backplane 1 are formed by the plurality of inner side frames 12 and the inner bottom frame 11 of the backplane 1. That is, the inner corner 13 is provided at an intersection of three planes where the inner bottom frame 11 and two adjacent inner side frames 12 are located. For example, the backplane 1 includes four inner corners 13. As shown in FIGS. 4 and 5, the fixing portion 41 of the middle frame 4 includes outer corners 43 matching with the inner corners 13. The outer corner 43 is located at a bending position of the fixing portion 41. For example, the fixing portion 41 includes four fixing sub-portions, and the outer corner 43 is formed at an intersection of two adjacent fixing sub-portions. The middle frame 4 includes four outer corners 43. The four outer corners 43 of the middle frame 4 are in one-to-one correspondence with the four inner corners 13 of the backplane 1.

In the backlight module, the middle frame is used to support and protect all the optical films inside the backlight module. In a case where the backlight module is applied to the display module, the middle frame is further used to support the display panel in the display module, plays a role of maintaining a distance between the display panel and the optical films, and is connected to a front frame of the display module. A surface of the middle frame facing a light exit side of the backlight module, that is, the side of the middle frame away from the backplane of the backlight module is called a front surface of the middle frame. Accordingly, a surface of the middle frame facing the backplane of the backlight module is called a back surface of the middle frame. The front and back surfaces of the middle frame have different structures, which can be visually distinguished by naked eyes, and thus the front and back surfaces of the middle frame are difficult to be confused. In a case of assembling the backplane and the middle frame, the installation directions of the two easily confused is the correspondence relationship between the plurality of inner corners of the backplane and the plurality of outer corners of the middle frame.

The fool-proof structure is provided at least at an inner corner 13 of the backplane 1 and an outer corner 43 of the middle frame 4 corresponding to the inner corner 13. The fool-proof structure is used to distinguish the installation directions of the backplane 1 and the middle frame 4, so as to achieve a fool-proof design for the inner corner 13 of the backplane 1 and the outer corner 43 of the middle frame 4 corresponding to the inner corner. In a case of assembling the backlight module 10, a surface of the middle frame 4 proximate to the backplane 1 and a surface of the middle frame 4 away from the backplane 1 have different structures, which can be visually distinguished by naked eyes, and the fool-proof structure will be used to distinguish the installation directions of the backplane 1 and the middle frame 4 during assembling the backplane 1 and the middle frame 4.

In the backlight module 10 provided by some embodiments of the present disclosure, the fool-proof structure is provided at least at the inner corner 13 of the backplane 1 and the outer corner 43 of the middle frame 4 corresponding to the inner corner 13, so that the shape design of the inner corner 13 of the backplane 1 and the outer corner 43 of the middle frame is different from the conventional design. With the fool-proof structure of mutually corresponding structures as identification marks, it is convenient for the production personnel to quickly identify the installation directions during assembling the middle frame 4 and the backplane 1, thereby improving the efficiency of production and assembly and the rate of assembly.

Some possible implementations of the fool-proof structure are described below.

In some embodiments, as shown in FIG. 1, the middle frame 4 includes a fixing portion 41 and an extension portion 42. An end of the extension portion 42 of the middle frame 4 is connected to the fixing portion 41, and the other end of the extension portion 42 of the middle frame 4 extends to a side of the optical film set 3 away from the inner bottom frame 11 of the backplane 1, that is, the extension portion 42 of the middle frame 4 extends from the fixing portion 41 toward the first accommodation space R1, and extends to an upper side of the first accommodation space R1 and encloses part of the first accommodation space R1 to surround the optical film set 3.

For example, the extension portion 42 of the middle frame 4 is perpendicular to the fixing portion 41, and an orthographic projection of the extension portion 42 on the optical film set 3 is located at an edge of the optical film set 3 and is in a frame shape. The extension portion 42 of the middle frame 4 may limit the optical film set 3 and the light source 2 in the first accommodation space R1 and play a position limiting role.

As shown in FIG. 1, the upper side of the first accommodation space R1 refers to a side of an opening of the backplane 1, that is, the first accommodation space R1 enclosed by the inner bottom frame 11 and the plurality of inner side frames 12 of the backplane 1 is provided far away from the inner bottom frame 11 of the backplane 1.

As shown in FIGS. 2 and 3A, at least one inner side frame 12 in the plurality of inner side frames 12 of the backplane 1 is a selected inner side frame 121. At least one inner corner 13 in the plurality of inner corners 13 of the backplane 1 is a first selected inner corner 131, and the first selected inner corner 131 is formed by the selected inner side frame 121, an inner side frame 12 adjacent to the selected inner side frame 121, and the inner bottom frame 11.

The selected inner side frame 121 is a frame with a special design selected from the plurality of inner side frames 12 (this part will be introduced later), and the first selected inner corner 131 is located at an end of the selected inner side frame 121.

As shown in FIGS. 4 and 5, in the plurality of outer corners 43 included in the fixing portion 41 of the middle frame 4, at least one outer corner 43 is a first selected outer corner 431, and the position of the first selected outer corner 431 of the middle frame 4 corresponds to the position of the first selected inner corner 131 of the backplane 1. The first selected outer corner 431 is provided outside the first selected inner corner 131.

The fool-proof structure includes a first identification structure B1 disposed at the first selected inner corner 131 of the backplane 1 and a second identification structure B2, matching with the first identification structure B1, disposed at the first selected outer corner 431 of the middle frame 4.

The first identification structure B1 refers to a special design performed on the structure at the first selected inner corner 131 of the backplane 1, so that an appearance of the first selected inner corner 131 of the backplane 1 is different from appearances of other inner corners 13. The second identification structure B2 refers to a special design performed on the structure at the first selected outer corner 431 of the middle frame 4, so that an appearance of the first selected outer corner 431 of the middle frame 4 is different from appearances of other outer corners 43. The first identification structure B1 and the second identification structure B2 are used as the fool-proof structure to achieve fool-proof during assembly of the middle frame, so that the correspondence relationship between the plurality of inner corners 13 of the backplane 1 and the plurality of outer corners 43 of the middle frame 4 may be quickly and clearly distinguished during assembly.

In the above embodiments, the front and back surfaces of the middle frame 4 may be distinguished by the extension portion 42 of the middle frame 4. For example, as shown in FIG. 1, the extension portion 42 of the middle frame 4 and the fixing portion 41 of the middle frame 4 form a step shape at a side proximate to the backplane 1, and a side of the middle frame 4 away from the backplane 1 has a different structure from a side of the middle frame 4 proximate to the backplane 1. Therefore, the front and back surfaces of the middle frame 4 may be distinguished quickly. During assembly, a side of the middle frame 4 provided with the extension portion 42 corresponds to a side of the optical film set 3 away from the inner bottom frame 11 of the backplane 1.

Then, the first identification structure B1 provided at the first selected inner corner 131 of the backplane 1 and the second identification structure B2 provided at the first selected outer corner 431 of the middle frame 4 are identified to distinguish the correspondence relationship between the plurality of inner corners 13 of the backplane 1 and the plurality of outer corners 43 of the middle frame 4. Since the first identification structure B1 matches with the second identification structure B2, the two only need to be matched during assembly, so that the production personnel can quickly identify the installation directions of the backplane 1 and the middle frame 4, complete the correct assembly, and improve the efficiency of production and assembly and the rate of assembly.

In some embodiments, as shown in FIGS. 1, 2 and 3A, any inner side frame 12 in the plurality of inner side frames 12 of the backplane 1 includes an inner surface 12a and an outer surface 12b that are opposite, and an surface of the inner side frame 12 facing the first accommodation space R1 is the inner surface 12a of the inner side frame 12. An inner side frame 12 of the backplane 1 adjacent to the selected inner side frame 121 and for forming the first selected inner corner 131 is the first adjacent inner side frame 122.

Figure 6:
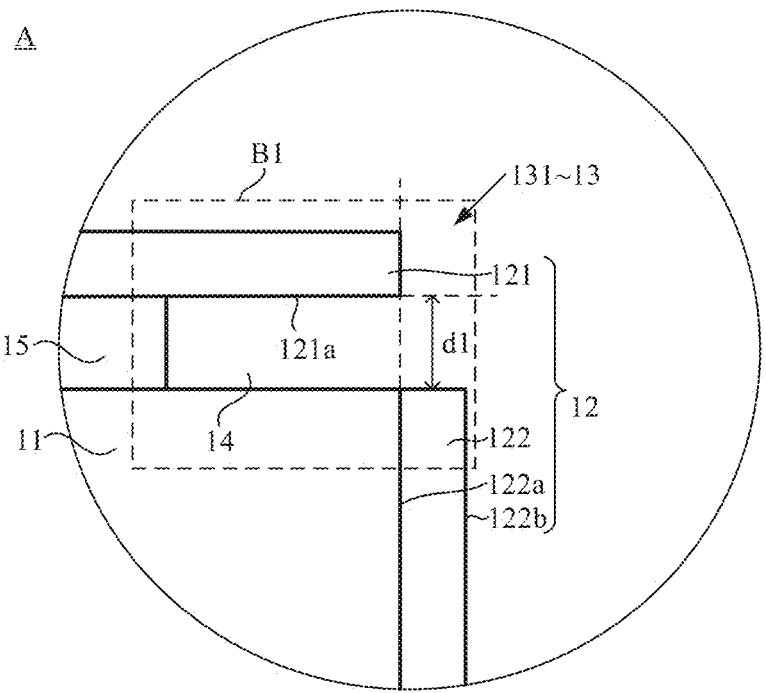
FIG. 6 is an enlarged view showing a structure of a region A in FIG. 3A.

As shown in FIG. 6, an end of the selected inner side frame 121 of the backplane 1 proximate to the first selected inner corner 131 is flush with an inner surface 122a of the first adjacent inner side frame 122. There is a first set distance d1 between an end of the first adjacent inner side frame 122 of the backplane 1 proximate to the first selected inner corner 131 and an inner surface 121a of the selected inner side frame 121. Ends of the selected inner side frame 121 and the first adjacent inner side frame 122 of the backplane 1 are not connected. The structure of the backplane 1 at the first selected inner corner 131 serves as the first identification structure B1.

The end of the selected inner side frame 121 proximate to the first selected inner corner 131 extends to a position flush with the inner surface 122a of the first adjacent inner side frame 122. In some examples, as shown in FIG. 3A, a dimension r3 of the selected inner side frame 121 in the first direction X is greater than or equal to a dimension r4 of the inner bottom frame 11 of the backplane 1 in the first direction X. The first direction X is an extension direction of the selected inner side frame 121. As shown in FIG. 6, there is a first set distance d1 between the end of the first adjacent inner side frame 122 of the backplane 1 proximate to the first selected inner corner 131 and the inner surface of the selected inner side frame 121. The distance is not limited, as long as it is ensured that the end of the first adjacent inner side frame 122 proximate to the first selected inner corner 131 does not extend to a position flush with an inner surface of the selected inner side frame 121.

In some examples, as shown in FIG. 3A, a dimension r1 of the first adjacent inner side frame 122 in the second direction Y is less than a dimension r2 of the inner bottom frame 11 of the backplane 1 in the second direction Y. The second direction Y is an extension direction of the first adjacent inner side frame 122.

In this way, as shown in FIGS. 3B and 6, the ends, proximate to each other, of the selected inner side frame 121 and the first adjacent inner side frame 122 of the backplane 1 are not connected, and have a certain distance therebetween, which can be understood as an end of the first adjacent inner side frame 122 is partially missing compared to the original structure. The structure of the backplane 1 at the first selected inner corner 131 serves as the first identification structure B1.

Figure 7:
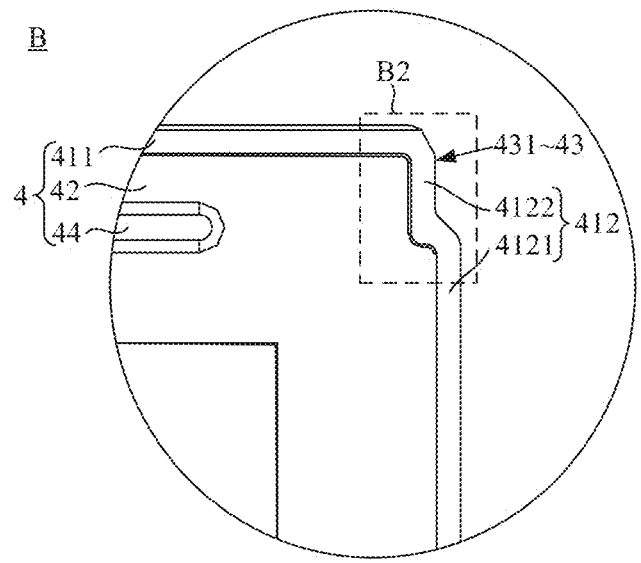
FIG. 7 is an enlarged view showing a structure of a region B in FIG. 4.
Figure 8:
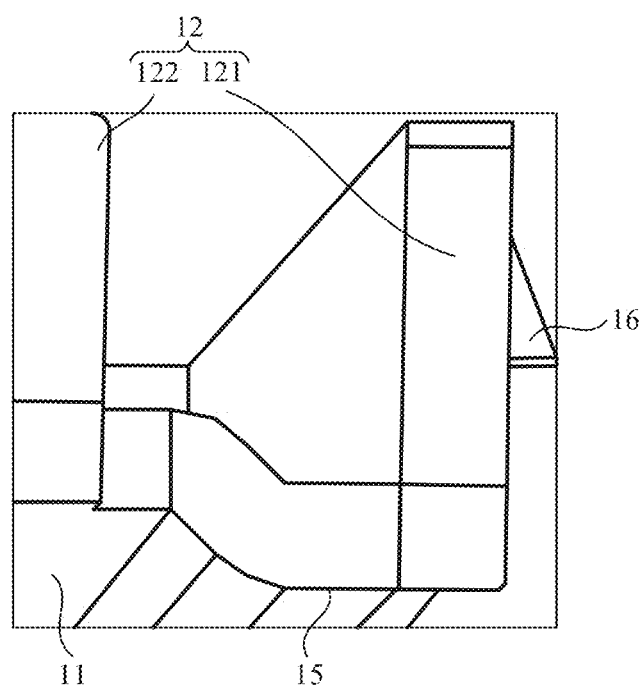
FIG. 8 is a structural diagram of a notch position in a backplane of a backlight module, in accordance with some embodiments.

As shown in FIGS. 4, 5 and 7, the fixing portion 41 of the middle frame 4 includes a first fixing sub-portion 411 surrounding the selected inner side frame 121 of the backplane 1 and a second fixing sub-portion 412 surrounding the first adjacent inner side frame 122 of the backplane 1. The second fixing sub-portion 412 of the middle frame 4 includes at least a first part 4121 and a second part 4122. The first part 4121 of the second fixing sub-portion 412 of the middle frame 4 is located outside the first adjacent inner side frame 122 of the backplane 1. The second part 4122 of the second fixing sub-portion 412 of the middle frame 4 is flush with the first adjacent inner side frame 122 of the backplane 1 and is connected to the first fixing sub-portion 411 of the middle frame 4. The structure of the middle frame 4 at the first selected outer corner 431 of the middle frame 4 serves as the second identification structure B2.

As shown in FIGS. 3A, 6 and 7, the second identification structure B2 of the middle frame 4 matches with the first identification structure B1 of the backplane 1. Since the ends of the selected inner side frame 121 and the first adjacent inner side frame 122 of the backplane 1 that are proximate to each other are not connected, an end of the first adjacent inner side frame 122 is partially missing compared to the original structure. The missing position is filled by the second part 4122 of the second fixing sub-portion 412 of the middle frame 4, that is, the first part 4121 and the second part 4122 of the second fixing sub-portion 412 extend in the same direction but not in the same straight line. The second part 4122 is concave toward a side proximate to the backplane 1, so that the first selected outer corner 431 of the middle frame 4 has a structure fitting with the first selected inner corner 131 of the backplane 1.

It can be seen referring to FIG. 7 that the first selected outer corner 431 of the middle frame 4 forms a concave structure different from the conventional right-angle structure, where the concave structure is taken as the second identification structure B2. In this way, the installation directions of the plurality of inner corners 13 of the backplane 1 and the plurality of outer corners 43 of the middle frame 4 may be quickly identified through the first identification structure B1 and the second identification structure B2, which is conducive to quickly and correctly completing assembly of the backplane 1 and the middle frame 4.

In some embodiments, as shown in FIGS. 2, 3A, 6 and 8, the inner bottom frame 11 of the backplane 1 is provided with a notch 14 therein at the first selected inner corner 131, and an end of the first adjacent inner side frame 122 of the backplane 1 proximate to the first selected inner corner 131 is flush with the notch 14.

For example, as shown in FIGS. 3A and 6, the inner bottom frame 11 of the backplane 1 is not in a shape of a complete square. The inner bottom frame 11 has a notch 14 at the first selected inner corner 131. For example, an edge of the notch 14 is flush with an end of the first adjacent inner side frame 122 of the backplane 1 proximate to the first selected inner corner 131.

Figure 9:
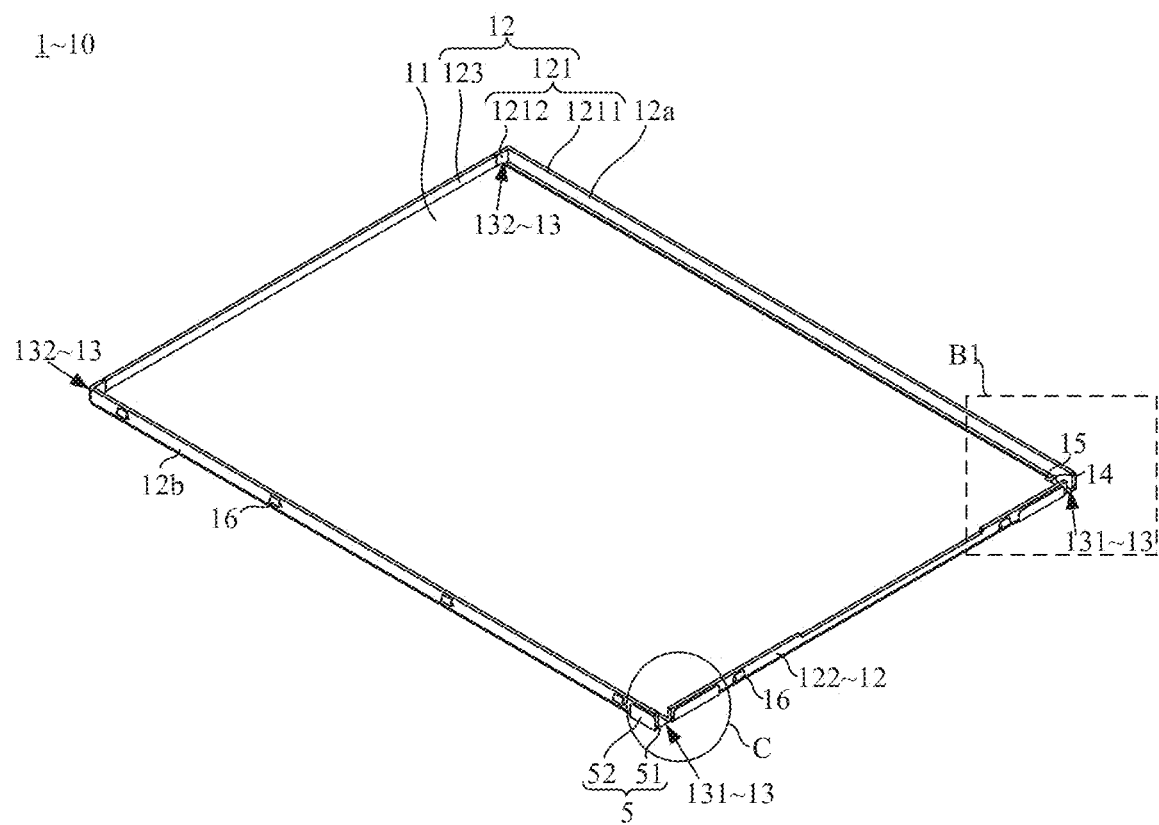
FIG. 9 is a structural diagram of a backplane and a protective structure of a backlight module, in accordance with some embodiments.
Figure 10:
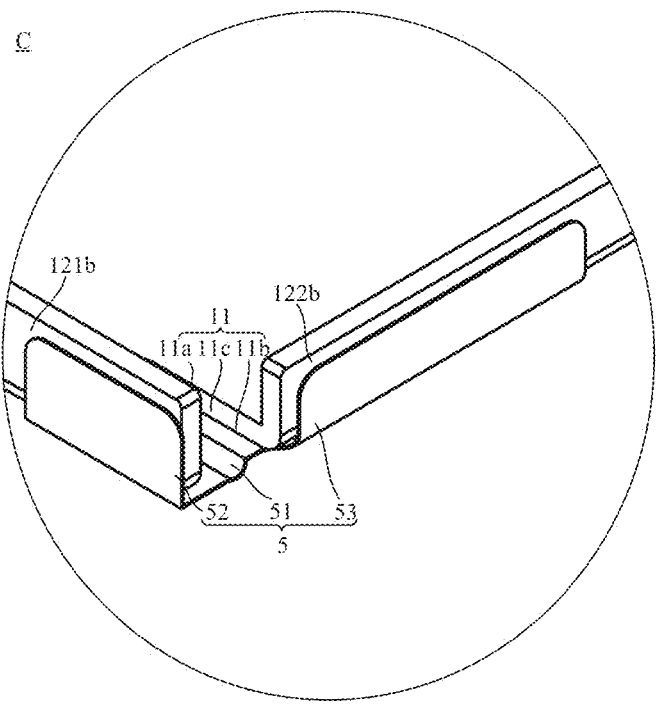
FIG. 10 is an enlarged view showing a structure of a region C in FIG. 9.

The backlight module 10 further includes a protective structure 5 disposed at the first selected inner corner 131 of the backplane 1. As shown in FIGS. 9 and 10, the protective structure 5 includes a main body portion 51 that is disposed on a side of the second surface 11b of the inner bottom frame 11, so as to block the notch 14 of the inner bottom frame 11 of the backplane 1 at the first selected inner corner 131. The first identification structure B1 further includes the notch 14 and the protective structure 5.

A notch design is performed on the inner bottom frame 11 of the backplane 1 at the first selected inner corner 131 and may be clearly distinguished from other inner corners 13, so as to facilitate fool-proof during assembly. The protective structure 5 is provided to block the notch and may prevent light leakage and block entry of dust, and the protective structure 5 may also serve as a relatively obvious first identification structure B1.

For example, the protective structure 5 is a black tape. The black tape is attached to the notch 14. The black tape may prevent reflection of light, and has characteristics of thinness and low-cost. Using the black tape as the first identification structure B1 may be clearly distinguished.

In some examples, as shown in FIGS. 9 and 10, the protective structure 5 further includes a first extension portion 52. An end of the first extension portion 52 of the protective structure 5 is connected to the main body portion 51, and the other end of the first extension portion 52 extends to an outer surface 121b of the selected inner side frame 121 of the backplane 1.

In some other examples, as shown in FIGS. 9 and 10, the protective structure 5 further includes a first extension portion 52 and a second extension portion 53. An end of the first extension portion 52 of the protective structure 5 is connected to the main body portion 51, and the other end of the first extension portion 52 extends to an outer surface 121b of the selected inner side frame 121 of the backplane 1. An end of the second extension portion 53 of the protective structure 5 is connected to the main body portion 51, and the other end of the second extension portion 53 extends to an outer surface 122b of the first adjacent inner side frame 122 of the backplane 1.

By providing the first extension portion 52 and the second extension portion 53 of the protective structure 5, the protective structure 5 may be closely attached to the backplane 1, and an area of the protective structure 5 may increase to make the first identification structure B1 rather obvious.

In some embodiments, as shown in FIGS. 2 and 3A, at least one inner corner 13 in the plurality of inner corners 13 of the backplane 1 is a second selected inner corner 132. The second selected inner corner 132 of the backplane 1 and the first selected inner corner 131 of the backplane 1 are respectively located at both ends of the selected inner side frame 121 of the backplane 1.

As shown in FIGS. 4 and 5, in the plurality of outer corners 43 included in the fixing portion 41 of the middle frame 4, at least one outer corner 43 is a second selected outer corner 432. The position of the second selected outer corner 432 of the middle frame 4 corresponds to the position of the second selected inner corner 132 of the backplane 1. The second selected outer corner 432 is located outside the second selected inner corner 132.

The fool-proof structure further includes a third identification structure B3 disposed at the second selected inner corner 132 of the backplane 1 and a fourth identification structure B4, matching with the third identification structure B3, disposed at the second selected outer corner 432 of the middle frame 4.

The third identification structure B3 refers to a special design performed on the structure at the second selected inner corner 132 of the backplane 1, so that an appearance of the second selected inner corner 132 of the backplane 1 is different from appearances of other inner corners 13. The fourth identification structure B4 refers to a special design performed on the structure at the second selected outer corner 432 of the middle frame 4, so that an appearance of the second selected outer corner 432 of the middle frame 4 is different from appearances of other outer corners 43. The third identification structure B3 and the fourth identification structure B4 are used as the fool-proof structure to achieve fool-proof during assembly of the backplane 1 and the middle frame 4, so that the correspondence relationship between the plurality of inner corners 13 of the backplane 1 and the plurality of outer corners 43 of the middle frame 4 may be quickly and correctly distinguished.

In the above embodiments, the fool-proof structure not only includes the first identification structure B1 at the first selected inner corner 131 of the backplane 1 and the second identification structure B2 at the first selected outer corner 431 of the middle frame 4, but also is provided with the third identification structure B3 at the second selected inner corner 132 of the backplane 1 and the fourth identification structure B4 at the second selected outer corner 432 of the middle frame 4. Since the first identification structure B1 matches with the second identification structure B2, and the third identification structure B3 matches with the fourth identification structure B4, the two sets of identification structures are matched to each other during assembly, so that the production personnel can rather quickly identify the installation directions, thereby further improving the efficiency of production and assembly and the rate of assembly.

Figure 11:
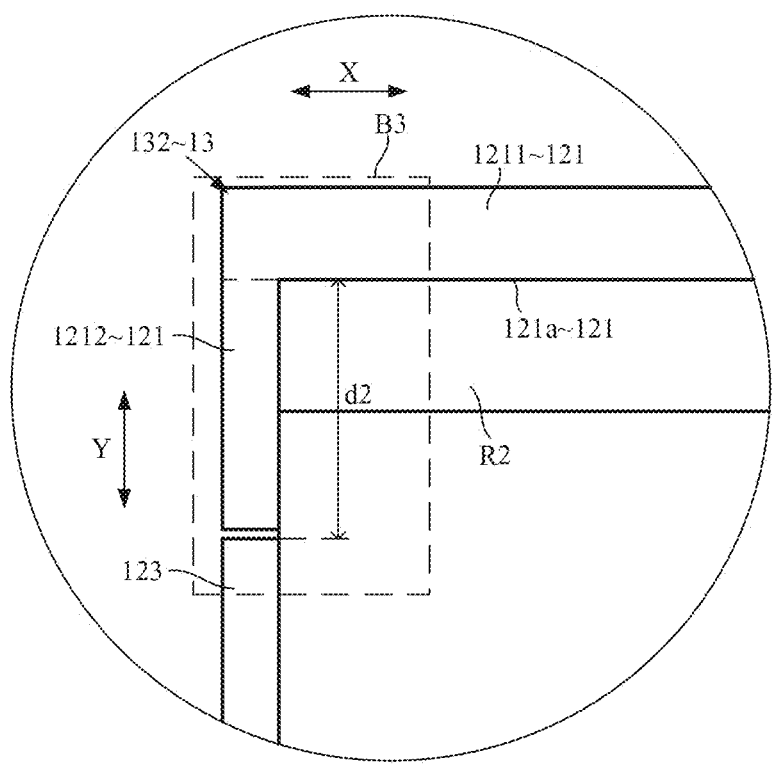
FIG. 11 is a top view showing an enlarged structure of a second selected inner corner position of a backplane of a backlight module, in accordance with some embodiments.
Figure 12:
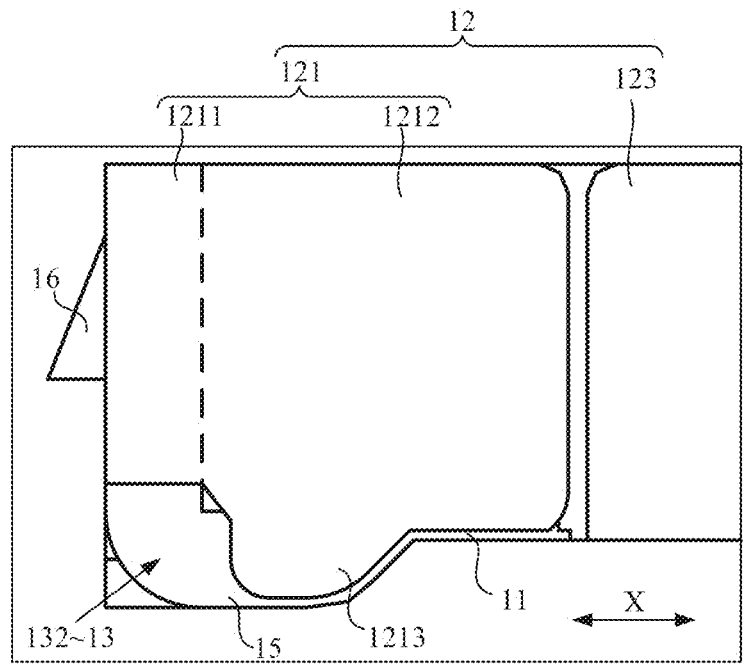
FIG. 12 is an enlarged structural view of a second selected inner corner position of a backplane of a backlight module, in accordance with some embodiments.

In some embodiments, as shown in FIGS. 2 and 3A, an inner side frame 12 adjacent to the selected inner side frame 121 of the backplane 1 and for forming the second selected inner corner 132 is the second adjacent inner side frame 123. As shown in FIGS. 11 and 12, the selected inner side frame 121 of the backplane 1 includes a first part 1211 and a second part 1212. The first part 1211 of the selected inner side frame 121 of the backplane 1 is connected to a side surface of the inner bottom frame 11 of the backplane 1 and extends toward a side of the first surface 11a of the inner bottom frame 11 of the backplane 1. There is a second set distance d2 between an end of the second adjacent inner side frame 123 of the backplane 1 proximate to the second selected inner corner 132 of the backplane 1 and an inner surface of the first part 1211 (i.e., the inner surface 121a) of the selected inner side frame 121 of the backplane 1.

As shown in FIG. 12, the first part 1211 of the selected inner side frame 121 is connected to a side surface of the inner bottom frame 11 of the backplane 1. A dimension of the first part 1211 of the selected inner side frame 121 in the first direction X and a dimension of the side surface of the inner bottom frame 11 in the first direction X are equal and have the same lengths. The first part 1211 of the selected inner side frame 121 extends toward the side of the first surface 11a of the inner bottom frame 11 of the backplane 1.

There is a second set distance d2 between an end of the second adjacent inner side frame 123 of the backplane 1 proximate to the second selected inner corner 132 of the backplane 1 and the inner surface of the selected inner side frame 121 of the backplane 1. The distance is not limited, as long as it is ensured that the end of the second adjacent inner side frame 123 proximate to the second selected inner corner 132 does not extend to a position flush with the inner surface 121a of the selected inner side frame 121. In some examples, a dimension of the second adjacent inner side frame 123 in the second direction Y is less than a dimension of the inner bottom frame 11 of the backplane 1 in the second direction Y.

For example, as shown in FIGS. 3A and 3B, the second adjacent inner side frame 123 and the first adjacent inner side frame 122 of the backplane 1 are provided oppositely and are parallel, have the same lengths, and neither of them extends to a position flush with the inner surface 121a of the selected inner side frame 121. It can be understood that an end of the second adjacent inner side frame 123 is partially missing compared to the original structure.

As shown in FIG. 11, the second part 1212 of the selected inner side frame 121 of the backplane 1 is bent from an end of the first part 1211 of the selected inner side frame 121 of the backplane 1 toward the second adjacent inner side frame 123 of the backplane 1, and is adjacent to the second adjacent inner side frame 123. A bending position of the selected inner side frame 121 of the backplane 1 is the second selected inner corner 132.

As shown in FIGS. 3A and 11, the second part 1212 of the selected inner side frame 121 of the backplane 1 is connected to the first part 1211 and bents toward the second adjacent inner side frame 123, and is adjacent to the second adjacent inner side frame 123 of the backplane 1. That is, a length of the second part 1212 of the selected inner side frame 121 in an extending direction thereof (referring to the Y direction shown in FIG. 11) is equal to the distance d2 between the end of the second adjacent inner side frame 123 and the inner surface 121a of the selected inner side frame 121 of the backplane 1. The second part 1212 of the selected inner side frame 121 fills the missing part of the end of the second adjacent inner side frame 123 relative to the original structure.

As shown in FIG. 11, the position where the selected inner side frame 121 is bent toward the second adjacent inner side frame 123 forms, for example, a right angle, and the inner corner 13 formed by the right angle and the inner bottom frame 11 serves as the second selected inner corner 132.

It can be understood that if the selected inner side frame 121 does not include the second part 1212 bent toward the second adjacent inner side frame 123, the first accommodation space R1 is not completely surrounded at the second selected inner corner 132, and there is an opening. In a case where there is a foreign object outside the opening, the foreign object will enter the first accommodation space R1 through the opening, thereby causing the optical film set 3 contained therein to be at risk of being scratched. The second part 1212 of the selected inner side frame 121 of the backplane 1 is designed as the side wrapping and forms an enclosed corner at the second selected inner corner 132 of the backplane 1, thereby effectively avoiding risk of scratching the film material due to the presence of the opening at the corner.

Figure 13:
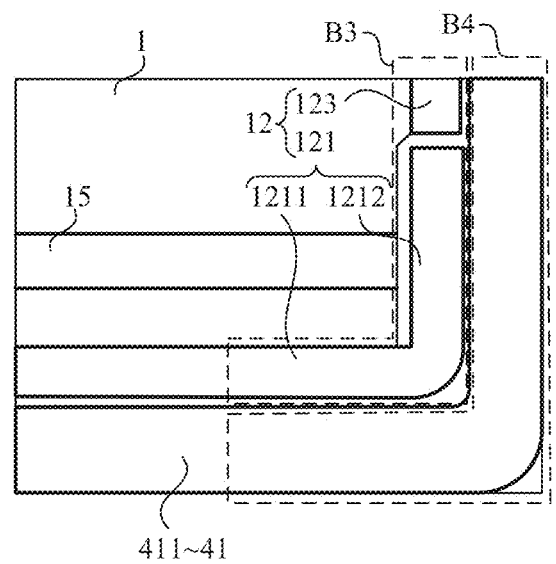
FIG. 13 is a structural diagram of a third identification structure of a backplane and a fourth identification structure of a middle frame of a backlight module, in accordance with some embodiments.
Figure 14:
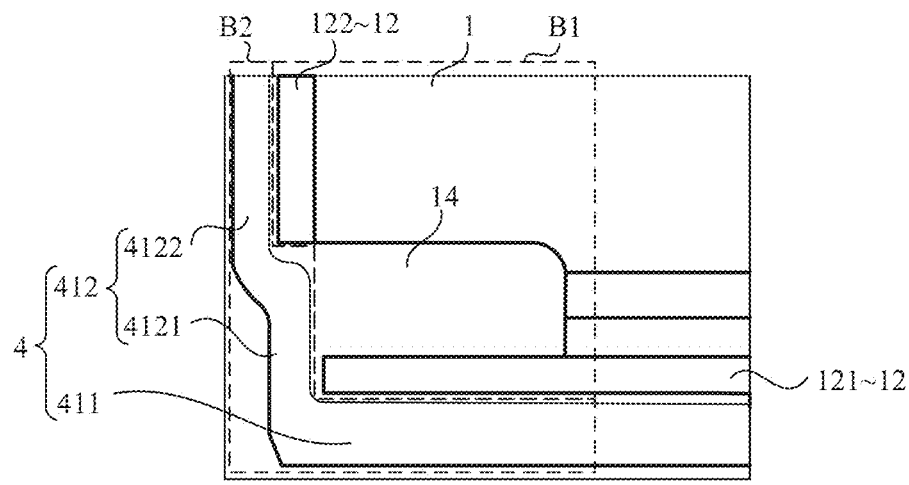
FIG. 14 is a structural diagram of a first identification structure of a backplane and a second identification structure of a middle frame of a backlight module, in accordance with some embodiments.

As shown in FIGS. 5, 9, 11 and 13, the structure of the backplane 1 at the second selected inner corner 132 serves as the third identification structure B3. As shown in FIG. 13, the second selected outer corner 432 of the middle frame 4 has a right-angled structure that matches with the second selected inner corner 132 of the backplane 1, and the right-angled structure serves as the fourth identification structure B4.

As shown in FIGS. 5, 9, 11, 13 and 14, the fixing portion 41 of the middle frame 4 also forms a right angle outside the second selected inner corner 132, and the right angle serves as the second selected outer corner 432. That is, the second selected inner corner 132 and the second selected outer corner 432 both have right-angle structures, and serve as the third identification structure B3 and the fourth identification structure B4, respectively. Different from the concave structure formed at first selected outer corner 431 of the middle frame 4, it is easy to distinguish the installation directions and achieve alignment based on the four identification structures to complete the assembly.

An exemplary structure of a whole of the backplane 1 and the middle frame 4 is provided below.

In some embodiments, as shown in FIGS. 2, 3A, 4 and 5, the plurality of inner side frames 12 of the backplane 1 include two selected inner side frames 121, a first adjacent inner side frame 122 and a second adjacent inner side frame 123. The two selected inner side frames 121 are provided oppositely, and the first adjacent inner side frame 122 and the second adjacent inner side frame 123 are provided oppositely.

As shown in FIGS. 2, 3A, 4 and 5, the plurality of inner corners 13 of the backplane 1 include two first selected inner corners 131 and two second selected inner corners 132. The two first selected inner corners 131 are respectively located at both ends of the first adjacent inner side frame 122 of the backplane 1, and the two second selected inner corners 132 are respectively located at both ends of the second adjacent inner side frame 123 of the backplane 1.

As shown in FIGS. 4 and 5, the plurality of outer corners 43 of the middle frame 4 include two first selected outer corners 431 and two second selected outer corners 432. The positions of the two first selected outer corners 431 respectively correspond to the positions of the two first selected inner corners 131 of the backplane 1, and the positions of the two second selected outer corners 432 of the middle frame 4 respectively correspond to the positions of the two second selected inner corners 132 of the backplane 1.

As shown in FIGS. 2 and 3A, in the structure described in the above embodiments, the backplane 1 includes two selected inner side frames 121 provided oppositely. The backplane 1 includes two first selected inner corners 131 and two second selected inner corner 132. The middle frame 4 includes two first selected outer corners 431 and two second selected outer corners 432. The corresponding outer corner 431 and inner corner 131 are called a corner L. As shown in FIGS. 1 and 5, four corners L included in the backlight module 10 are a first corner L1, a second corner L2, a third corner L3 and a fourth corner L4. For example, a group of corresponding first selected inner corners 131 and first selected outer corners 431 constitute the third corner L3, and another group of corresponding first selected inner corners 131 and first selected outer corners L3 constitute the fourth corner L4, a group of corresponding second selected inner corners 132 and second selected outer corner 432 constitute the first corner L1, and another group of corresponding second selected inner corners 132 and second selected outer corner 432 constitute the second corner L2.

The third corner L3 and the fourth corner L4 are adjacent and located on the same side of the selected inner side frame 121, and the third corner L3 and the fourth corner L4 each have the first identification structure B1 and the second identification structure B2 that are matched. The first corner L1 and the second corner L2 are adjacent and located on the other side of the selected inner side frame 121, and the third corner L3 and the fourth corner L4 each have the third identification structure B3 and the fourth identification structure B4 that are matched. For example, the third corner L3 and the fourth corner L4 have the same designs, the first corner L1 and the second corner L2 have the same designs, and the third corner L3 and the first corner L1 have different designs.

The fool-proof design is carried out at the four corners, and each corner is provided with identification structures that are matched; that is, the fool-proof structure included in the backlight module includes four groups of identification structures. In this way, it is easy to distinguish the installation directions of the backplane 1 and the middle frame 4 during assembly, and distinguish the correspondence relationship between the plurality of inner corners 13 of the backplane 1 and the plurality of outer corners 43 of the middle frame 4, thereby facilitating rapid assembly and improving production efficiency.

In some embodiments, the backlight module is a side-type backlight module. The light source 2 includes a light bar 21 and a light guide plate 22.

Figure 16:
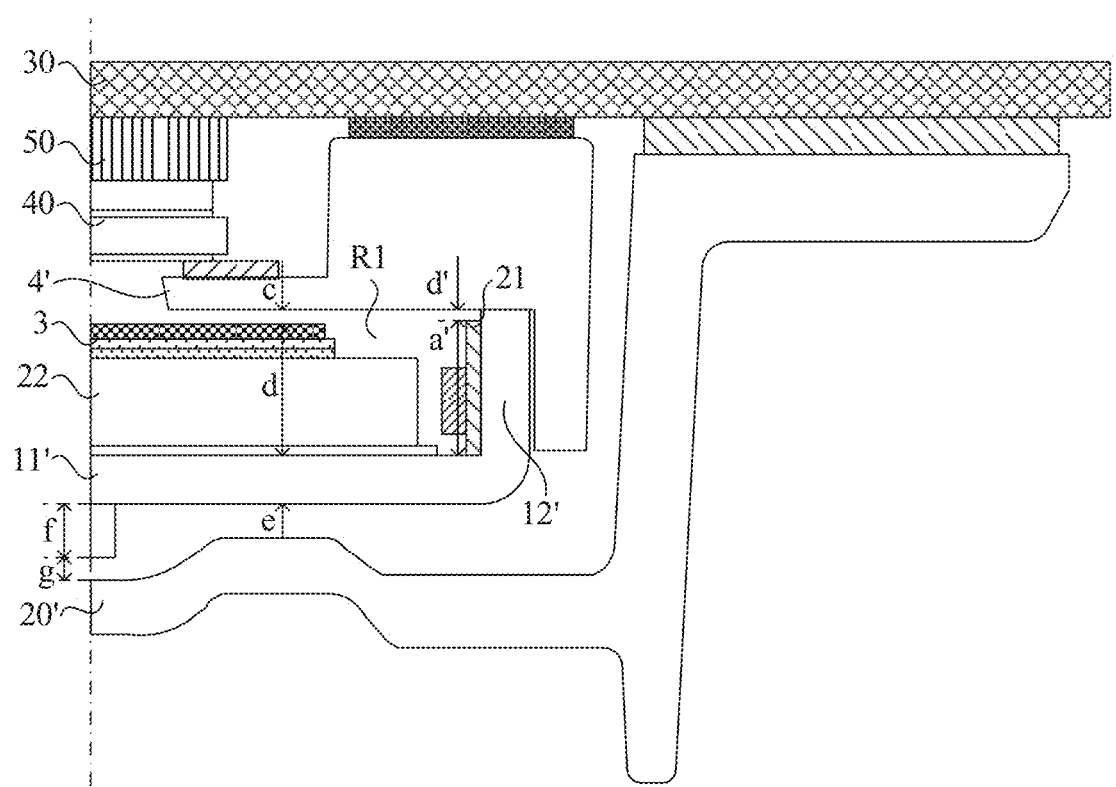
FIG. 16 is a sectional view showing a structure of another touch display apparatus, in accordance with some embodiments.

As shown in FIG. 16, in an implementation, the light bar 21 and the light guide plate 22 are provided in such a way that the light guide plate 22 is located in the first accommodation space R1, and the optical film set 3 is located on a side of the light guide plate 22 away from the inner bottom frame 11'. The light bar 21 is located at an end of the light guide plate 22, and the light bar 21 is disposed on a side of the inner surface of the inner side frame 12'. For example, the light bar 21 is attached to the inner surface of the inner side frame 12' of the backplane. The light emitted by the light bar 21 enters the light guide plate 22 from the end of the light guide plate, is converted into a surface light source through the light guide function of the light guide plate, and exits from the side of the light guide plate 22 away from the inner bottom frame 11' of the backplane.

In some examples, the light bar 21 includes a light bar substrate 211 and a plurality of light-emitting devices 212 disposed on the light bar substrate 211. The light-emitting devices 212 include but are not limited to mini light-emitting diodes (mini LEDs) and micro light-emitting diodes (micro LEDs).

Figure 15A:
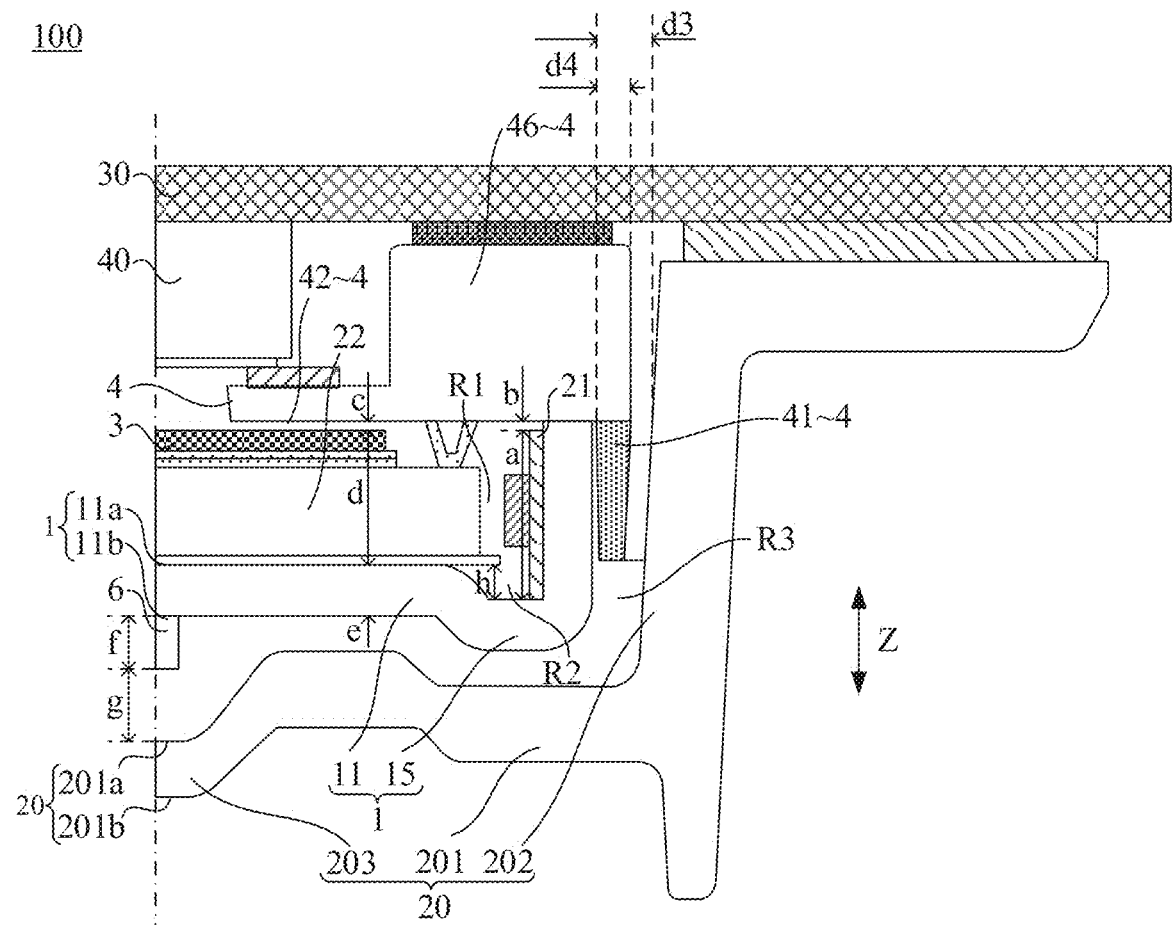
FIG. 15A is a sectional view showing a structure of a display apparatus, in accordance with some embodiments.
Figure 15B:
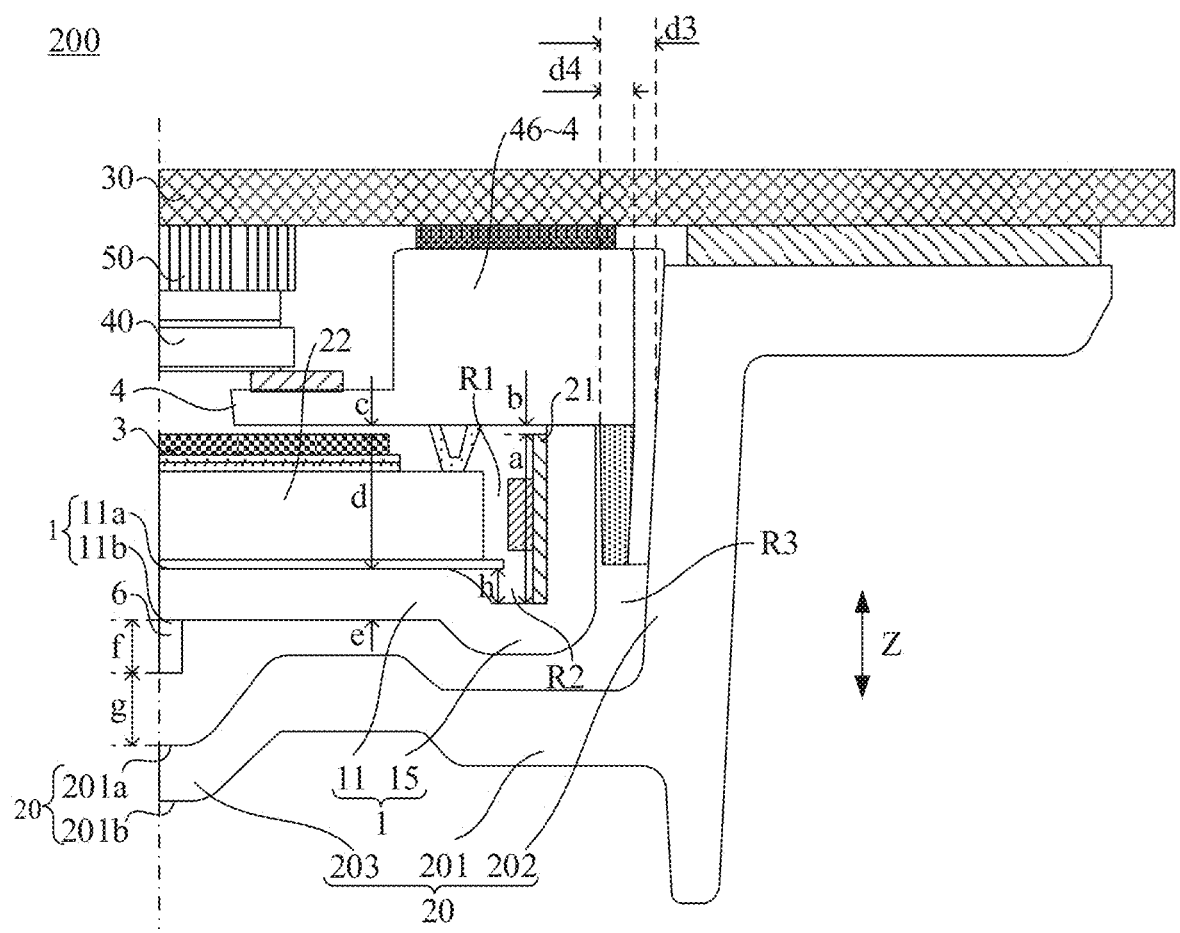
FIG. 15B is a sectional view showing a structure of a touch display apparatus, in accordance with some embodiments.

As shown in FIGS. 15A and 15B, the backlight module 10 further includes a circuit board 6. The circuit board 6 is disposed on a side of the second surface 11b of the inner bottom frame 11 of the backplane 1. The circuit board 6 is connected to the light bar 21 and is configured to provide a driving signal for the light bar 21 to drive the plurality of light-emitting devices 212 in the light bar 21 to emit light.

For example, a conductive adhesive is provided on a side of the circuit board away from the backplane, and the conductive adhesive is configured to prevent electrostatic discharge and play an anti-radiation and anti-interference role.

It will be noted that a surface of the circuit board away from the backplane includes a working region. The working region includes conductive lines and other circuit components. There is no contact between the components on the circuit board and the conductive adhesive (including but not limited to a case where there is no physical contact and/or electrical connection between the two). In some examples, a part of the conductive adhesive opposite to the working region of the circuit board is provided with, for example, polyethylene terephthalate (PET), thereby ensuring that the components on the circuit board will not be electrically connected to each other by conductive adhesive to cause a short circuit problem.

An overall structure consisting of the circuit board and the conductive adhesive is described below.

The backlight module 10 is applied in the display apparatus 100. As shown in FIG. 15A, the display apparatus 100 further includes a rear shell 20. The rear shell 20 includes an outer bottom frame 201 and a plurality of outer side frames 202. The outer bottom frame 201 includes a first surface 201a and a second surface 201b that are opposite, and a plurality of side surfaces each connecting the first surface 201a and the second surface 201b of the outer bottom frame 201 of the rear shell 20. The plurality of outer side frames 202 of the rear shell 20 are respectively connected to the plurality of side surfaces of the outer bottom frame 201 of the rear shell 20 and extend toward a side of the first surface 201a of the outer bottom frame 201 of the rear shell 20.

The rear shell 20 has a sunken structure. The outer bottom frame 201 and the plurality of outer side frames 202 of the rear shell 20 enclose to form a third accommodation space R3. The backlight module 10 is located in the third accommodation space R3.

As shown in FIGS. 15A and 15B, a width a of the light bar 21 is a dimension of the light bar 21 in a direction perpendicular to the inner bottom frame 11 of the backplane 1. A distance between the light bar 21 and the middle frame 4 is b, and the distance b is, for example, 0.2 mm. A distance between a surface of the optical film set 3 and the middle frame 4 is c, and the distance c is, for example, 0.3 mm. A distance between a surface of the optical film set and the first surface 11a of the inner bottom frame 11 is d. The thickness of the backplane 1 is e, which is generally set in a range of 0.6 mm to 1.2 mm, inclusive. A dimension of an overall structure composed of the circuit board 6 and the conductive adhesive in a direction perpendicular to the inner bottom frame 11 of the backplane 1 is f, and a distance between the overall structure composed of the circuit board and the conductive adhesive and the rear shell is g.

For example, the thickness e of the backplane 1 is 0.6 mm, 0.8 mm or 1.2 mm.

It can be understood that the thickness e of the backplane 1 mentioned here refers to a thickness of the inner bottom frame 11 of the backplane 1 (a dimension of the inner bottom frame 11 of the backplane 1 in a direction perpendicular to the first surface 11a). In some examples, a thickness of each of the plurality of inner side frames of the backplane (a dimension of the inner side frame perpendicular to the inner surface thereof) is the same as the thickness of the inner bottom frame of the backplane.

For example, the distance g between the overall structure composed of the circuit board and the conductive adhesive and the rear shell is in a range of 0.6 mm to 1.2 mm, inclusive. The distance g between the overall structure composed of the circuit board and the conductive adhesive and the rear shell is, for example, 0.6 mm, 0.9 mm or 1.2 mm.

In some examples, as shown in FIGS. 15A and 15B, a sum of a and b is equal to a sum of c and d (i.e., a+b=c+d).

In a case of high brightness requirements for the backlight module 10, an area of the light bar 21 needs to increase, so that the number of the plurality of light-emitting devices 212 increases. In this way, the width a of the light bar 21 increases, and a volume of the required first accommodation space R1 increases.

As shown in FIG. 16, on a premise of keeping the value of k that is equal to a sum of c, d, e, f and g (i.e., c+d+e+f+g=k) unchanged, the volume of the first accommodation space R1 increases. If values of c, e, f and k are kept unchanged, the distance g between the overall structure composed of the circuit board 6 and the conductive adhesive and the rear shell 20 is reduced. Thus, the distance between the circuit board 6 and the rear shell 20 is excessively close, and the risk of interference between the components on the circuit board 6 and the rear shell 20 may increase. Moreover, as the volume of the first accommodation space R1 increases, the thickness of the light guide plate 22 also increases, resulting in weakened luminous efficiency, thereby affecting the light extraction effect of the backlight module 10.

Figure 17:
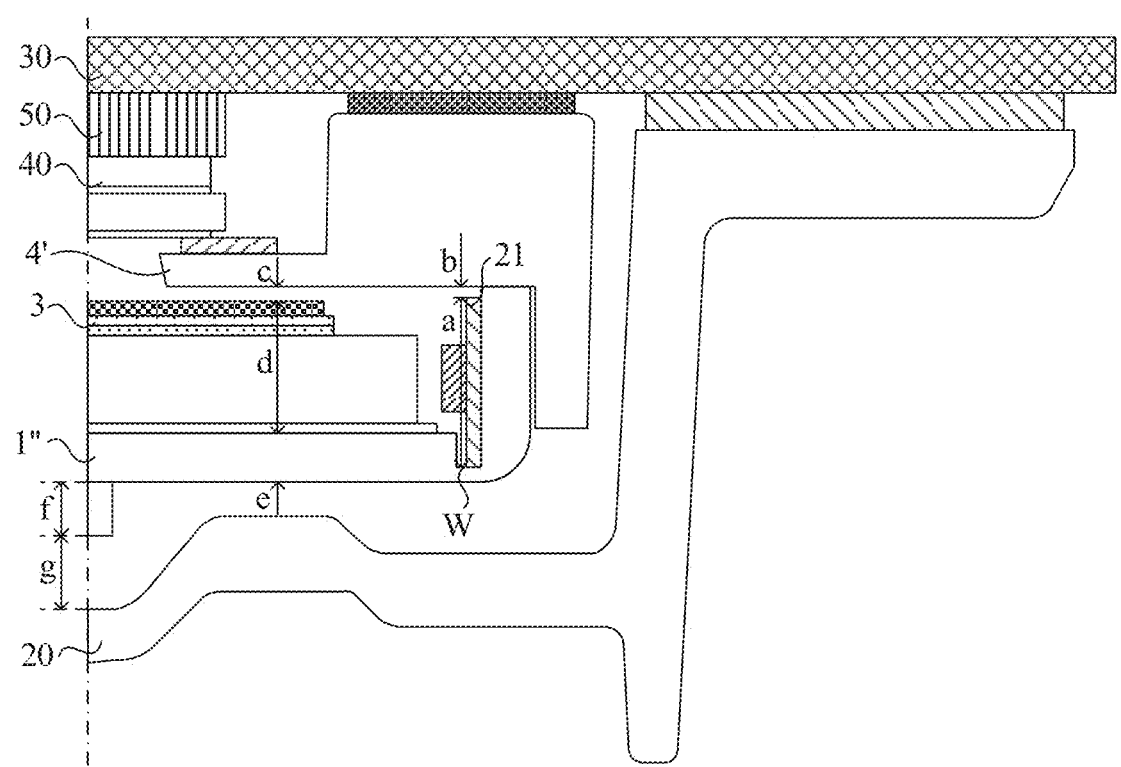
FIG. 17 is a sectional view showing a structure of yet another touch display apparatus, in accordance with some embodiments.

As shown in FIG. 17, another way to place the light bar 21 is to provide a slot W in the inner bottom frame of the backplane 1'', and put an end of the light bar 21 into the slot W. However, this way will make the thickness of the inner bottom frame at the position of the slot W reduced, resulting in reduced strength, concentrated stress, and being prone to deformation.

In the backlight module 10 provided by some embodiments of the present disclosure, the backplane 1 adopts the design shown in FIG. 15A or FIG. 15B. The thickness of the backlight module will not increase additionally, and the distance between the circuit board and the rear shell will not be reduced while the width of the light bar is ensured to increase to improve the brightness of the backlight module. In addition, compared with the structure shown in FIG. 17, the strength of the backplane is ensured and the deformation of the backplane may be avoided.

The width of the light bar described here refers to a dimension of the light bar in a direction perpendicular to the inner bottom frame of the backplane.

In some embodiments, as shown in FIGS. 1, 15A and 15B, an outer convex portion 15 facing a side of the second surface 11b of the inner bottom frame 11 of the backplane 1 is provided at a position of the inner bottom frame 11 of the backplane 1 proximate to the selected inner side frame 121 of the backplane 1. The outer convex portion 15 on the inner bottom frame 11 of the backplane 1 and the selected inner side frame 121 of the backplane 1 form the second accommodation space R2. The outer convex portion 15 of the inner bottom frame 11 of the backplane 1 extends in the extending direction of the selected inner side frame 121 of the backplane 1, and an end of the light bar 21 is located in the second accommodation space R2.

A position of the inner bottom frame 11 of the backplane 1 proximate to the selected inner side frame 121 protrudes outward, thereby forming the second accommodation space R2. It will be noted that the outer convex portion 15 belongs to a part of the inner bottom frame 11, the first accommodation space R1 contains the second accommodation space R2, and the first accommodation space R1 of the backplane 1 shown in FIG. 1, FIG. 15A or FIG. 15B is larger than the first accommodation space R1 of the conventionally designed backplane 1 shown in FIG. 16. An end of the light bar 21 is located in the second accommodation space R2. In this way, even if the thickness a of the light bar 21 increases, since the outer convex portion 15 is only provided at the position of the inner bottom frame 11 of the backplane 1 proximate to the selected inner side frame 121, the light bar 21 can be placed in the second accommodation space R2 without affecting the distance c, the distance d and the thickness e of the backplane 1.

Therefore, there is no need to change the values of c, e, f and k of the backplane 1. Then, the distance g between the overall structure composed of the circuit board and the conductive adhesive and the rear shell remains unchanged, that is, the design of widening the light bar is taken into account while the distance between the circuit board and the rear shell is not reduced, so as to meet the brightness requirements of the backlight module without increasing the risk of interference between the components on the circuit board and the rear shell and without increasing the structural and functional risk of the backlight module, thereby improving the quality of the backlight module.

It will be noted that the light bar 21 is in a long-strip shape and is attached to the inner surface of the selected inner side frame 121 of the backplane 1. The outer convex portion 15 of the backplane 1 is also in a long-strip shape, and the extension direction of the outer convex portion, the extension direction of the light bar 21 and the extension direction of the selected inner side frame 121 are all consistent.

In some embodiments, as shown in FIGS. 1, 15A and 15B, the backlight module 10 further includes a reflective sheet 23. The reflective sheet 23 is disposed between the light guide plate 22 and the inner bottom frame 11 of the backplane 1 and used for reflecting light.

In some embodiments, as shown in FIGS. 1, 15A and 15B, a set direction Z is perpendicular to the first surface 11a of the inner bottom frame 11. A sum of a dimension of the light bar 21 in the set direction Z (the width a of the light bar 21) and a distance b between the light bar 21 and the middle frame 4 (the extension portion 42 of the middle frame 4) in the set direction is equal to a sum of a distance d between a surface of the optical film set 3 away from the inner bottom frame 11 and the first surface 11a of the inner bottom frame 11, a distance c between the surface of the optical film set 3 away from the inner bottom frame 11 and the middle frame 4 (the extension portion 42 of the middle frame 4) in the set direction, and a dimension h of the second accommodation space R2 in the set direction (i.e., a+b=c+d+h).

For example, the distance d between the surface of the optical film set 3 away from the inner bottom frame 11 and the first surface 11a of the inner bottom frame 11 is equal to a sum of the thickness of the optical film set 3, the thickness of the light guide plate 22 and the thickness of the reflective sheet.

In some examples, the light source included in the display module includes one light bar 21. Accordingly, the backplane 1 includes one selected inner side frame 121, and the inner bottom frame 11 of the backplane 1 has one outer convex portion 15. For the design of single-sided light bar, a fool-proof structure may not be provided. The installation directions of the backplane 1 and the middle frame 4 may be distinguished through the position of the light bar 21 and the position of the outer convex portion 15, so as to achieve rapid assembly.

In some examples, the light source included in the display module includes two light bars 21, and the two light bars 21 are respectively disposed at opposite sides of the backplane 1. Accordingly, the backplane 1 includes two selected inner side frame 121 that are provided oppositely, and the inner bottom frame 11 of the backplane 1 has two outer convex portions 15. For the design of double-sided light bars, the installation directions of the backplane 1 and the middle frame 4 cannot be distinguished through the positions of the light bars and the positions of the outer convex portions. In this way, the fool-proof design mentioned above needs to be used.

In some embodiments, as shown in FIG. 11, the selected inner side frame 121 includes a first part 1211 and a second part 1212, and the second part 1212 of the selected inner side frame 121 is bent from an end of the first part 1211 of the selected inner side frame 121 toward the second adjacent inner side frame 123.

The selected inner side frame 121 further includes a convex part 1213 disposed on a side of the second part 1212 facing the second surface 11b of the inner bottom frame 11 of the backplane 1. An orthographic projection of the outer convex portion 15 of the inner bottom frame 11 on a first plane is at least overlapped with an orthographic projection of the convex part 1213 of the selected inner side frame 121 on the first plane, and the first plane is perpendicular to an extension direction of the outer convex portion 15 of the inner bottom frame 11 of the backplane 1.

The second part 1212 and the convex part 1213 of the selected inner side frame 121 are located in the same plane, that is, the second part 1212 of the selected inner side frame 121 has a downward protrusion. Since the inner bottom frame 11 has an outer convex portion 15, if there is no convex part 1213 at the bottom of the second part 1212 of the selected inner side frame 121, the outer convex portion 15 will leave a gap at a position proximate to the second part 1212 of the selected inner side frame 121, causing light leakage and the entry of external dust. The orthographic projections of the outer convex portion 15 of the inner bottom frame 11 of the backplane 1 and the convex part 1213 of the selected inner side frame 121 on the first plane at least partially overlap, and the convex part 1213 at the bottom of the second part 1212 of the selected inner side frame 121 can block at least part of the gap formed by the outer convex portion 15 of the backplane 1, thereby playing a certain effect of preventing light leakage and blocking entry of dust.

In some examples, as shown in FIG. 12, the convex part 1213 at the bottom of the second part 1212 of the selected inner side frame 121 completely block the gap formed by the outer convex portion 15 of the inner bottom frame 11, thereby achieving a sealing effect and further playing a role of shading light and blocking dust.

In some embodiments, as shown in FIGS. 1, 15A and 15B, the material of the middle frame 4 is metal, for example, the middle frame 4 is called an iron middle frame. The extension portion and the fixing portion of the middle frame 4 are made of metal and have a small thickness. Since metal reflects light, a bright line of light is likely to appear at the extension portion 42 after the light exiting from the optical film set is reflected by the middle frame. Therefore, a black tape needs to be attached to prevent reflection of light, which increases the process and the cost.

In some other embodiments, as shown in FIGS. 1, 15A and 15B, the material of the middle frame 4 is rubber, for example, the middle frame 4 is called a rubber middle frame. Compared with the iron middle frame, the rubber middle frame is thicker and has lower strength, is prone to deformation, but the rubber middle frame will not reflect light.

In some embodiments, as shown in FIGS. 1, 15A and 15B, the material of the fixing portion 41 of the middle frame 4 includes metal, and the material of the extension portion 42 of the middle frame 4 includes rubber.

The middle frame 4 adopts an integrated structure of rubber and iron. The fixing portion 41 surrounding the backplane 1 is made of a metal material, and thus the frame width of the module may be reduced while a stable connection is ensured. The extension portion 42 on the light exit side is made of a rubber material, and thus the bright lines caused by the reflected light may be effectively avoided.

In the backlight module, the middle frame 4 is made of metal and rubber. The fixing portion 41 of the middle frame 4 is made of metal, and the extension portion 42 of the middle frame 4 is made of rubber. In this way, advantages of metal and rubber can be combined. Since rubber absorbs light and reflection of light will not occur, rubber is used to form the extension portion 42, and thus no bright lines of light caused by reflection of light will appear at the position where the extension portion overlaps with the optical film set, Moreover, the middle frame 4 may be applied to touch liquid crystal module (TLCM) products of attached first and then assembled.

In some examples, the middle frame 4 with an integrated structure of rubber and iron is applied to the TLCM products of attached first and then assembled that are fixed with a super sticky double-sided tape (also called very high bond, VHB).

The process of attached first and then assembled here means that the display apparatus includes, for example, a backlight module, a display panel and a touch module; during assembly of the display apparatus, the touch module and the display panel are first attached to form a touch display panel, and then the touch display panel and the backlight module are combined into a touch display module.

In addition, due to the high strength of metal, the thickness of the iron frame is smaller than that of the rubber frame under the same strength requirements. Therefore, using metal to form the fixing portion 41 may reduce the thickness of the fixing portion 41 and achieve narrowing the frame of the module. Further, the metal frame is not prone to deformation and has a good stability. For example, as shown in FIGS. 15A and 15B, the fixing portion 41 of the middle frame 4 is made of the metal material, so that a thickness d4 of the fixing portion 41 of the middle frame 4 is reduced significantly compared with a case of using the rubber frame and ensuring the same connection strength and supporting effect. It can be understood that with such a design, in a case of the backlight module being applied to a display module, a frame width of the display module may be significantly reduced.

For example, the metal for forming the fixing portion 41 is iron, steel, or the like.

In some examples, as shown in FIGS. 1, 15A and 15B, the fixing portion 41 and the extension portion 42 of the middle frame 4 are of an integral structure, and the middle frame 4 is manufactured by integral formation. The process is relatively simple, for example, metal and rubber are teemed successively into a mold to form the middle frame 4.

For example, as shown in FIGS. 1, 15A and 15B, a thickness of any part of the fixing portion 41 of the middle frame 4 in a direction perpendicular to the inner surface 12a of the inner side frame 12, corresponding to the part of the fixing portion 41, of the backplane 1 is in a range of 0.3 mm to 0.5 mm, inclusive.

In some examples, the thickness of any part of the fixing portion 41 of the middle frame 4 in a direction perpendicular to the inner surface 12a of the inner side frame 12, corresponding to the part of the fixing portion 41, of the backplane 1 is 0.3 mm, 0.4 mm or 0.5 mm.

In some embodiments, as shown in FIGS. 1 and 4, the middle frame 4 further includes at least one positioning protrusion 44 disposed on a side of the extension portion 42 facing the optical film set 3. The positioning protrusion 44 abuts against the light guide plate 22 to limit the position of the light guide plate 22 in the first accommodation space R1.

The positioning protrusion 44 abuts against the light guide plate 22 to limit the movement of the light guide plate 22 in the Z direction shown in FIG. 1. Since the positioning protrusion 44 abuts against the light guide plate 22, the light guide plate 22 and the reflective sheet 23 are attached rather closely. Furthermore, the movement of the light guide plate 22 in the Y direction shown in FIG. 1 may also be limited.

The positioning protrusion 44 serves as a fixed structure and plays a position-limiting role, thereby avoiding a poor light extraction effect caused by loose due to shift of the positions of the light guide plate and the optical film set, which is caused by moving back and forth of the light guide plate and the optical film set during assembly.

For example, the positioning protrusion 44 is sectioned along a plane perpendicular to a plane where a surface of the fixing portion 41 of the middle frame 4 proximate to a side of the inner bottom frame 11 of the backplane 1 is located. The cross-sectional shape of the outline of the positioning protrusion 44 includes but is not limited to trapezoid, square, rectangle, and triangle. In some examples, the positioning protrusion 44 has a solid structure. In some other examples, as shown in FIG. 1, the positioning protrusion 44 has a hollow structure.

Figure 18:
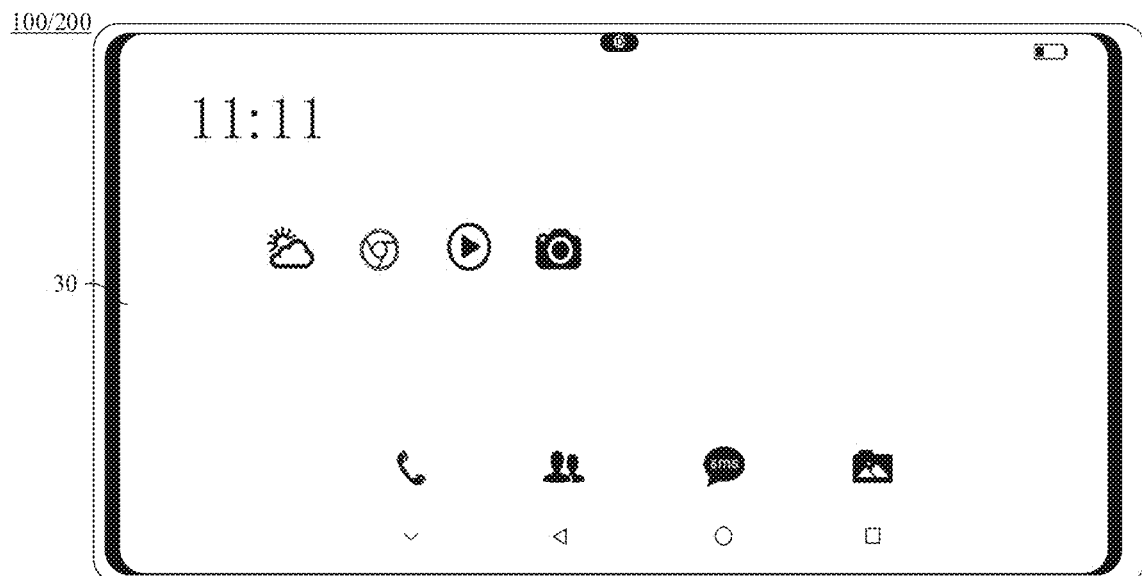
FIG. 18 is a structural diagram of a display apparatus, in accordance with some embodiments.
Figure 19:
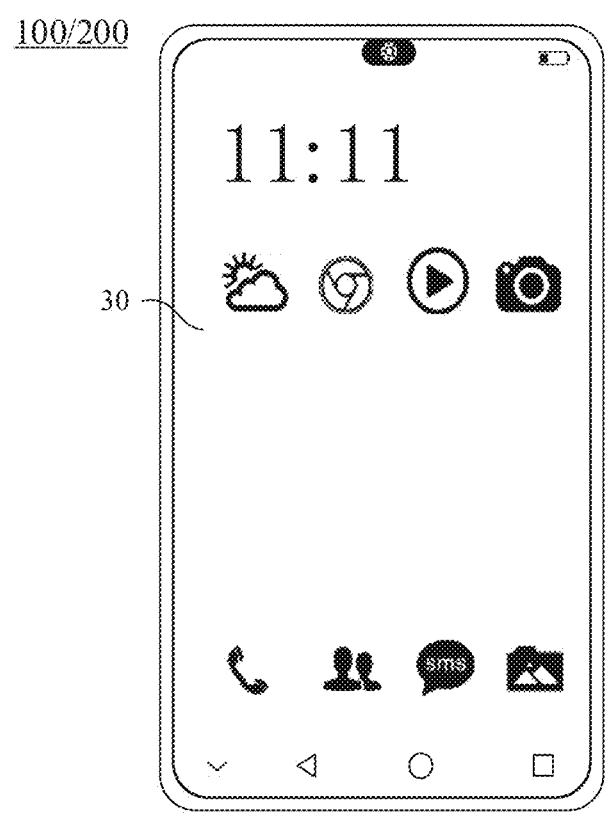
FIG. 19 is a structural diagram of another display apparatus, in accordance with some embodiments.

Some embodiments of the present disclosure provide a display apparatus 100. As shown in FIGS. 15A, 18 and 19, the display apparatus 100 includes the backlight module 10 as described in any of the above embodiments, a rear shell 20, a cover plate 30 and a display panel 40.

For example, the display apparatus 100 includes a display module, and the display module includes the backlight module 10 and the display panel 40.

The backplane 1 of the backlight module 10 includes an inner bottom frame 11 and a plurality of inner side frames 12. At least one inner side frame 12 in the plurality of inner side frames 12 of the backplane 1 is a selected inner side frame 121. An outer convex portion 15 facing a side of the second surface 11b of the inner bottom frame 11 of the backplane 1 is provided at a position of the inner bottom frame 11 of the backplane 1 proximate to the selected inner side frame 121. The outer convex portion 15 of the inner bottom frame 11 of the backplane 1 and the selected inner side frame 121 of the backplane 1 form a second accommodation space R2. The outer convex portion 15 of the inner bottom frame 11 of the backplane 1 extends in the extension direction of the selected inner side frame 121.

The rear shell 20 includes an outer bottom frame 201 and a plurality of outer side frames 202. The outer bottom frame 201 of the rear shell 20 includes a first surface 201a and a second surface 201b that are opposite, and a plurality of side surfaces each connecting the first surface 201a and the second surface 201b of the outer bottom frame 201 of the rear shell 20. The plurality of outer side frames 202 of the rear shell 20 are respectively connected to the plurality of side surfaces of the outer bottom frame 201 of the rear shell 20 and extend toward a side of the first surface 201a of the outer bottom frame 201 of the rear shell 20.

At least one outer side frame 202 in the plurality of outer side frames 202 of the rear shell 20 is a selected outer side frame 2021. An inner convex portion 203 facing the first surface 201a of the outer bottom frame 201 is provided at a position of the outer bottom frame 201 of the rear shell 20 proximate to the selected outer side frame 2021. The inner convex portion 203 of the rear shell 20 is clamped with the outer convex portion 15 of the backplane 1. The inner convex portion 203 of the rear shell 20 is further away from the selected outer side frame 2021 than the outer convex portion 15 of the backplane 1. An extension direction of the inner convex portion 203 of the rear shell 20 is the same as an extending direction of the outer convex portion 15 of the backplane 1.

The cover plate 30 is disposed on a side of the first surface 201a of the outer bottom frame 201 of the rear shell 20. The cover plate 30 and both the plurality of outer side frames 202 and the outer bottom frame 201 of the rear shell 20 form a third accommodation space R3. The backlight module 10 is disposed within the third accommodation space R3. The display panel 40 is disposed in the space between the extension portion 42 of the middle frame 4 and the cover plate 30.

The rear shell 20 and the cover plate 30 surround the backlight module 10 and the display panel 40 to achieve protection. The outer bottom frame 201 of the rear shell 20 is provided with an inner convex portion 203 corresponding to the outer convex portion 15 of the inner bottom frame 11 of the backplane 1, that is, the outer bottom frame 201 of the rear shell 20 is concave inward, and the inner bottom frame 11 the backplane 1 is convex outward (the inner convex portion 203 of the outer bottom frame 201 of the rear shell 20 protrudes toward the inside of the third accommodation space R3, and the outer convex portion 15 of the inner bottom frame 11 of the backplane 1 protrudes toward a direction away from the first accommodation space R1 and proximate to the outer bottom frame 201 of the rear shell 20). Therefore, the rear shell 20 and the backplane 1 are both bent toward each other, so that the inner convex portion 203 of the rear shell 20 is clamped with the outer convex portion 15 of the backplane 1, thereby increasing the stability of the display apparatus 100.

In some embodiments, as shown in FIGS. 1, 15A and 15B, the middle frame 4 further includes a connecting portion 46, and the connecting portion 46 of the middle frame 4 is located on a side of the extension portion 42 away from the fixing portion 41. An end of the connecting portion 46 of the middle frame 4 away from the extension portion 42 is connected to the display panel 40. The connecting portion 46 of the middle frame 4 is used to fix the display panel 40.

For example, the display panel 40 is a liquid crystal display panel.

In some embodiments, as shown in FIGS. 15A and 15B, the middle of the outer bottom frame 201 of the rear shell 20 is provided with an inner convex portion 203 facing a side of the second surface 201b of the outer bottom frame 201 of the rear shell 20. A distance between the inner convex portion 203 of the outer bottom frame 201 of the rear shell 20 and the inner bottom frame 11 of the backplane 1 is greater than or equal to a distance between a remaining portion of the outer bottom frame 201 of the rear shell 20 and the inner bottom frame 11 of the backplane 1.

By providing the inner convex portion 203 in the middle of the outer bottom frame 201 of the rear shell 20, the accommodation space for the circuit board 6 increases. Further, the problem of the circuit board 6 being abnormal caused by the circuit board 6 and the components thereon in contact with the rear shell 20 may be avoided.

For example, the circuit board 6 includes but is not limited to a printed circuit board assembly (PCBA), a printed circuit board that undergoes an entire process of surface mounted technology (SMT) mounted or dual in-line package (DIP) insertion, or a flexible printed circuit (FPC).

In some embodiments, there is a third set distance d3 between a surface of the fixing portion 41 of the middle frame 4 away from the outer side frame 202 of the rear shell 20 and the outer side frame 202 of the rear shell 20.

In a case where the backlight module is applied to the display apparatus, for convenience of installation, the distance between the middle frame 4 and the rear shell 20 of the display apparatus cannot be too small. In a case where the distance is too small, the backlight module is not easy to be placed in the rear shell. In a case where the distance is too large, the frame width of the display apparatus will increase. It can be understood that as the frame width increases, the screen-to-body ratio of the display apparatus decreases accordingly, which does not meet actual usage requirements.

The middle frame 4 with an integrated structure of rubber and iron is used. The fixing portion of the middle frame is made of a metal material, so that a thickness d4 of the fixing portion of the middle frame is reduced compared with the fixing portion having a rubber structure. Further, the frame width of the display apparatus is ensured to meet the narrow frame design requirements of the display apparatus, the screen-to-body ratio of the display apparatus may increase, and the visual experience of the display apparatus may be optimized.

For example, in a case where the middle frame 4 with an integrated structure of rubber and iron is applied to the display apparatus 100, as shown in FIG. 15A, the cover plate 30 and the rear shell 20, the display panel 40 and the cover plate 30, the optical film set 3 and the backplane 1, and the backplane 1 and the circuit board 6 are respectively bonded by adhesive. The adhesive is, for example, double-sided adhesive, pressure sensitive adhesive (PSA), optically clear adhesive (OCA), or VHB.

In some examples, the cover plate 30 and the rear shell 20 are bonded by VHB.

In some other examples, the optical film set 3 includes a plurality of optical films, and any two adjacent optical films in the plurality of optical films are bonded by OCA.

Some embodiments of the present disclosure provide a touch display apparatus 200. As shown in FIGS. 15B, 18 and 19, the touch display apparatus 200 includes the display apparatus 100 as described in any of the above embodiments and a touch module 50. The touch module 50 is integrated inside the display panel 40 or disposed on a side of the display panel 40 away from the backlight module 10.

In some embodiments, the touch display apparatus is a vehicle-mounted touch display apparatus and is used in vehicles.

In some embodiments, as shown in FIG. 15A, the display apparatus 100 is, for example, a liquid crystal module (LCM). As shown in FIG. 15B, the touch display apparatus 200 is, for example, a TLCM. The appearances of the display apparatus 100 and the touch display apparatus 200 are, for example, as shown in FIGS. 18 and 19. There is no difference between the appearances of the two. The difference between the display apparatus 100 and the touch display apparatus 200 lies in whether the touch module 50 is included, that is, whether it has a touch function.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A backlight module, comprising:
   a backplane including an inner bottom frame and a plurality of inner side frames, the plurality of inner side frames and the inner bottom frame constituting a first accommodation space, wherein the inner bottom frame includes a first surface and a second surface that are opposite, and a plurality of side surfaces each connecting the first surface and the second surface; the plurality of inner side frames are respectively connected to the plurality of side surfaces of the inner bottom frame and extend toward a side of the first surface of the inner bottom frame;
   a light source disposed in the first accommodation space;
   an optical film set disposed in the first accommodation space; and
   a middle frame including a fixing portion surrounding the plurality of inner side frames of the backplane, the plurality of inner side frames of the backplane being connected to the fixing portion of the middle frame; wherein
   the backplane includes a plurality of inner corners defined by the plurality of inner side frames and the inner bottom frame, and the fixing portion of the middle frame includes outer corners corresponding to and matching with the inner corners; a fool-proof structure is disposed at least at an inner corner of the backplane and an outer corner of the middle frame, and the fool-proof structure is used to distinguish installation directions of the backplane and the middle frame;
   at least one inner side frame in the plurality of inner side frames is at least one selected inner side frame; the inner bottom frame includes an outer convex portion proximate to a selected inner side frame in the at least one selected inner side frame and facing a side of the second surface of the inner bottom frame, and the outer convex portion of the inner bottom frame and the selected inner side frame constitute a second accommodation space; the outer convex portion of the inner bottom frame extends in an extension direction of the selected inner side frame;
   the light source includes a light bar and a light guide plate; the light bar is attached to an inner surface of the selected inner side frame; an end of the light bar is located in the second accommodation space; and the light guide plate is located in the first accommodation space and located on a side of the optical film set proximate to the inner bottom frame;
   the selected inner side frame includes a first part and a second part; the first part of the selected inner side frame is connected to a side surface of the inner bottom frame and extends toward the side of the first surface of the inner bottom frame; and the second part of the selected inner side frame is bent from an end of the first part of the selected inner side frame toward an inner side frame adjacent to the selected inner side frame; and
   the selected inner side frame further includes a convex part disposed on a side of the second part facing the second surface of the inner bottom frame; an orthographic projection of the outer convex portion of the inner bottom frame on a first plane is at least overlapped with an orthographic projection of the convex part of the selected inner side frame on the first plane, and the first plane is perpendicular to an extension direction of the outer convex portion of the inner bottom frame.

2. The backlight module according to claim 1, wherein the middle frame further includes an extension portion, an end of the extension portion is connected to the fixing portion, and another end of the extension portion extends to a side of the optical film set away from the inner bottom frame;
   at least one inner corner in the plurality of inner corners is at least one first selected inner corner, and a first selected inner corner in the at least one first selected inner corner is defined by a selected inner side frame in the at least one selected inner side frame, an inner side frame adjacent to the selected inner side frame in the at least one selected inner side frame and the inner bottom frame;
   at least one outer corner in the plurality of outer corners included in the fixing portion of the middle frame is at least one first selected outer corner, and a position of a first selected outer corner in the at least one first selected outer corner corresponds to a position of the first selected inner corner in the at least one first selected inner corner; and
   the fool-proof structure includes a first identification structure disposed at the first selected inner corner and a second identification structure disposed at the first selected outer corner and matching with the first identification structure.

3. The backlight module according to claim 2, wherein any inner side frame in the plurality of inner side frames includes an inner surface and an outer surface that are opposite, and a surface of the inner side frame facing the first accommodation space is the inner surface of the inner side frame;

the inner side frame adjacent to the selected inner side frame in the at least one selected inner side frame and for defining the first selected inner corner in the at least one first selected inner corner is a first adjacent inner side frame;

an end of the selected inner side frame proximate to the first selected inner corner is flush with an inner surface of the first adjacent inner side frame; an end of the first adjacent inner side frame proximate to the first selected inner corner and an inner surface of the selected inner side frame have a first set distance therebetween; the end of the selected inner side frame and the end of the first adjacent inner side frame are not connected; and a structure of the backplane at the first selected inner corner serves as the first identification structure; and the fixing portion of the middle frame includes a first fixing sub-portion surrounding the selected inner side frame and a second fixing sub-portion surrounding the first adjacent inner side frame; the second fixing sub-portion at least includes a first part and second part, the first part of the second fixing sub-portion is located outside the first adjacent inner side frame, and the second part of the second fixing sub-portion is flush with the first adjacent inner side frame and connected to the first fixing sub-portion; and a structure of the middle frame at the first selected outer corner serves as the second identification structure.

4. The backlight module according to claim 3, wherein the inner bottom frame is provided with a notch therein at the first selected inner corner, and the end of the first adjacent inner side frame proximate to the first selected inner corner is flush with the notch;

the backlight module further comprises a protective structure disposed at the first selected inner corner;

the protective structure includes a main body portion; the main body portion is disposed on a side of the second surface of the inner bottom frame, and the main body portion blocks the notch; and the first identification structure further includes the notch and the protective structure.

5. The backlight module according to claim 4, wherein the protective structure further includes a first extension portion; an end of the first extension portion is connected to the main body portion, and another end of the first extension portion extends to an outer surface of the selected inner side frame; or the protective structure further includes a first extension portion and a second extension portion; an end of the first extension portion is connected to the main body portion, and another end of the first extension portion extends to an outer surface of the selected inner side frame; an end of the second extension portion is connected to the main body portion, and another end of the second extension portion extends to an outer surface of the first adjacent inner side frame.

6. The backlight module according to claim 2, wherein at least one inner corner in the plurality of inner corners is at least one second selected inner corner, and a second selected inner corner in the at least one second selected inner corner and the first selected inner corner in the at least one first selected inner corner are located on both sides of the selected inner side frame;

at least one outer corner in the plurality of outer corners included in the fixing portion of the middle frame is at least one second selected outer corner, and a position of a second selected outer corner in the at least one second selected outer corner corresponds to a position of the second selected inner corner in the at least one second selected inner corner; and the fool-proof structure further includes a third identification structure disposed at the second selected inner corner and a fourth identification structure disposed at the second selected outer corner and matching with the third identification structure.

7. The backlight module according to claim 6, wherein another inner side frame adjacent to the selected inner side frame in the at least one selected inner side frame and for defining the second selected inner corner in the at least one second selected inner corner is a second adjacent inner side frame;

an end of the second adjacent inner side frame proximate to the second selected inner corner and an inner surface of the first part of the selected inner side frame have a second set distance therebetween;

the second part of the selected inner side frame is bent from an end of the first part of the selected inner side frame toward the second adjacent inner side frame and connected to the second adjacent inner side frame; a bending position of the selected inner side frame is the second selected inner corner; a structure of the backplane at the second selected inner corner serves as the third identification structure; and the second selected outer corner of the middle frame has a right-angled structure matching with the second selected inner corner, and the right-angled structure serves as the fourth identification structure.

8. The backlight module according to claim 2, wherein the plurality of inner side frames include two selected inner side frames, a first adjacent inner side frame and a second adjacent inner side frame; the two selected inner side frames are disposed oppositely, and the first adjacent inner side frame and the second adjacent inner side frame are disposed oppositely;

the plurality of inner corners include two first selected inner corners and two second selected inner corners, the two first selected inner corners are located at both ends of the first adjacent inner side frame, and the two second selected inner corners are located at both ends of the second adjacent inner side frame; and the plurality of outer corners include two first selected outer corners and two second selected outer corners, positions of the two first selected outer corners respectively correspond to positions of the two first selected inner corners, and positions of the two second selected outer corners respectively correspond to positions of the two second selected inner corners.

9. The backlight module according to claim 2, a material of the fixing portion of the middle frame includes metal; and a material of the extension portion of the middle frame includes rubber.

10. The backlight module according to claim 9, wherein a thickness of any part of the fixing portion of the middle frame in a direction perpendicular to an inner surface of an inner side frame, corresponding to the part of the fixing portion, of the backplane is in a range of 0.3 mm to 0.5 mm, inclusive.

11. The backlight module according to claim 1, wherein a set direction is perpendicular to the first surface of the inner bottom frame;

a sum of a dimension of the light bar in the set direction and a distance between the light bar and the middle frame in the set direction is equal to a sum of a distance between a surface of the optical film set away from the inner bottom frame and the first surface of the inner bottom frame, a distance between the surface of the optical film set away from the inner bottom frame and the middle frame in the set direction, and a dimension of the second accommodation space in the set direction.

12. The backlight module according to claim 1, wherein the middle frame further includes at least one positioning protrusion disposed on a side of the extension portion facing the optical film set; and the at least one positioning protrusion abuts against the light guide plate to limit a position of the light guide plate in the first accommodation space.

13. The backlight module according to claim 1, further comprising:
   a snap-in structure including at least one snap-in piece disposed on outer surfaces of the plurality of inner side frames of the backplane, and a positioning connecting piece disposed on the middle frame and corresponding to the at least one snap-in piece; and the at least one snap-in piece cooperating with the positioning connecting piece to connect and fix the backplane and the middle frame.

14. A display apparatus, comprising:
   a backlight module according to claim 1, wherein the backplane of the backlight module includes the inner bottom frame and the plurality of inner side frames, and at least one inner side frame in the plurality of inner side frames is at least one selected inner side frame; the inner bottom frame includes an outer convex portion proximate to a selected inner side frame in the at least one selected inner side frame and facing a side of the second surface of the inner bottom frame, and the outer convex portion of the inner bottom frame and the selected inner side frame constitute a second accommodation space; the outer convex portion of the inner bottom frame extends in an extension direction of the selected inner side frame;
   a rear shell including an outer bottom frame and a plurality of outer side frames, wherein the outer bottom frame includes a first surface and a second surface that are opposite, and a plurality of side surfaces each connecting the first surface and the second surface of the outer bottom frame; the plurality of outer side frames are respectively connected to the plurality of side surfaces of the outer bottom frame and extend toward a side of the first surface of the outer bottom frame; at least one outer side frame in the plurality of outer side frames is at least one selected outer side frame; the outer bottom frame includes an inner convex portion proximate to a selected outer side frame in the at least one selected outer side frame and facing a side of the first surface of the outer bottom frame; the inner convex portion of the rear shell is clamped with the outer convex portion of the backplane; the inner convex portion of the rear shell is further away from the selected outer side frame than the outer convex portion of the backplane; an extension direction of the inner convex portion of the rear shell is the same as an extending direction of the outer convex portion of the backplane;
   a cover plate disposed on the side of the first surface of the outer bottom frame, wherein the cover plate and both the plurality of outer side frames and the outer bottom frame of the rear shell constitute a third accommodation space; and the backlight module is disposed within the third accommodation space; and
   a display panel disposed in a space between the middle frame and the cover plate.

15. A display apparatus, comprising:
   a backlight module, the backlight module comprising:
      a backplane including an inner bottom frame and a plurality of inner side frames, the plurality of inner side frames and the inner bottom frame constituting a first accommodation space, wherein the inner bottom frame includes a first surface and a second surface that are opposite, and a plurality of side surfaces each connecting the first surface and the second surface; the plurality of inner side frames are respectively connected to the plurality of side surfaces of the inner bottom frame and extend toward a side of the first surface of the inner bottom frame;
      a light source disposed in the first accommodation space;
      an optical film set disposed in the first accommodation space; and
      a middle frame including a fixing portion surrounding the plurality of inner side frames of the backplane, the plurality of inner side frames of the backplane being connected to the fixing portion of the middle frame, wherein
   the backplane includes a plurality of inner corners defined by the plurality of inner side frames and the inner bottom frame, and the fixing portion of the middle frame includes outer corners corresponding to and matching with the inner corners; a fool-proof structure is disposed at least at an inner corner of the backplane and an outer corner of the middle frame, and the fool-proof structure is used to distinguish installation directions of the backplane and the middle frame; and
   the backplane further includes the inner bottom frame and the plurality of inner side frames, and at least one inner side frame in the plurality of inner side frames is at least one selected inner side frame; the inner bottom frame includes an outer convex portion proximate to a selected inner side frame in the at least one selected inner side frame and facing a side of the second surface of the inner bottom frame, and the outer convex portion of the inner bottom frame and the selected inner side frame constitute a second accommodation space; the outer convex portion of the inner bottom frame extends in an extension direction of the selected inner side frame;
   a rear shell including an outer bottom frame and a plurality of outer side frames, wherein the outer bottom frame includes a first surface and a second surface that are opposite, and a plurality of side surfaces each connecting the first surface and the second surface of the outer bottom frame; the plurality of outer side frames are respectively connected to the plurality of side surfaces of the outer bottom frame and extend toward a side of the first surface of the outer bottom frame; at least one outer side frame in the plurality of outer side frames is at least one selected outer side frame; the outer bottom frame includes an inner convex portion proximate to a selected outer side frame in the at least one selected outer side frame and facing a side of the first surface of the outer bottom frame; the inner convex portion of the rear shell is clamped with the outer convex portion of the backplane; the inner convex portion of the rear shell is further away from the selected outer side frame than the outer convex portion of the backplane; an extension direction of the inner convex portion of the rear shell is the same as an extending direction of the outer convex portion of the backplane;

a cover plate disposed on the side of the first surface of the outer bottom frame, wherein the cover plate and both the plurality of outer side frames and the outer bottom frame of the rear shell constitute a third accommodation space; and the backlight module is disposed within the third accommodation space; and a display panel disposed in a space between the middle frame and the cover plate.

16. The display apparatus according to claim 15, wherein the middle frame further includes an extension portion connected to the fixing portion, and a connecting portion located on a side of the extension portion away from the fixing portion; and an end of the connecting portion away from the extension portion is connected to the display panel.

17. The display apparatus according to claim 15, wherein a surface of the fixing portion of the middle frame away from the outer side frame and the outer side frame have a third set distance therebetween.

18. A touch display apparatus, comprising:

the display apparatus according to claim 15; and a touch module integrated inside the display panel or disposed on a side of the display panel away from the backlight module.

19. The display apparatus according to claim 15, wherein a distance between the inner convex portion of the outer bottom frame and the inner bottom frame of the backplane is greater than or equal to a distance between a remaining portion of the outer bottom frame and the inner bottom frame of the backplane.

* * * * *